US011683606B2

(12) United States Patent
Mochizuki

(10) Patent No.: US 11,683,606 B2
(45) Date of Patent: Jun. 20, 2023

(54) IMAGING DEVICE AND ELECTRONIC EQUIPMENT

(71) Applicant: SONY SEMICONDUCTOR SOLUTIONS CORPORATION, Kanagawa (JP)

(72) Inventor: Futa Mochizuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 137 days.

(21) Appl. No.: 17/284,627

(22) PCT Filed: Oct. 16, 2019

(86) PCT No.: PCT/JP2019/040590
§ 371 (c)(1),
(2) Date: Apr. 12, 2021

(87) PCT Pub. No.: WO2020/080383
PCT Pub. Date: Apr. 23, 2020

(65) Prior Publication Data
US 2021/0400222 A1 Dec. 23, 2021

(30) Foreign Application Priority Data

Oct. 19, 2018 (JP) .............................. JP2018-197188
Oct. 2, 2019 (JP) .............................. JP2019-181896

(51) Int. Cl.
*H04N 5/374* (2011.01)
*H04N 5/3745* (2011.01)
(Continued)

(52) U.S. Cl.
CPC ........... *H04N 25/75* (2023.01); *H04N 25/766* (2023.01); *H04N 25/771* (2023.01); *H04N 25/772* (2023.01)

(58) Field of Classification Search
None
See application file for complete search history.

(56) References Cited

U.S. PATENT DOCUMENTS 4,982,343 A * 1/1991 Hourvitz ................ G09G 5/393
345/592
6,510,193 B1 * 1/2003 Kochi ............... H01L 29/76816
257/241
(Continued)

FOREIGN PATENT DOCUMENTS

CN  105721772 A  6/2016
JP  11-177892 A  7/1999
(Continued)

OTHER PUBLICATIONS

International Search Report and Written Opinion of PCT Application No. PCT/JP2019/040590, dated Dec. 24, 2019, 09 pages of ISRWO.

*Primary Examiner* — Mark T Monk
(74) *Attorney, Agent, or Firm* — Chip Law Group

(57) ABSTRACT

An imaging device of the present disclosure includes a plurality of pixels each including a light receiving element that performs photoelectric conversion on incident light to generate an electrical signal, the pixels outputs a detection signal when detecting that an amount of change of the electrical signal exceeds a predetermined threshold, and a control section that reads out, when pixels of a pixel combination of two or more pixels including a pixel of interest both output detection signals, the detection signals. Further, electronic equipment of the present disclosure includes the imaging device including the plurality of pixels and a detection section that have the above-mentioned configurations.

12 Claims, 20 Drawing Sheets

(51) Int. Cl.
  *H04N 25/75* (2023.01)
  *H04N 25/766* (2023.01)
  *H04N 25/771* (2023.01)
  *H04N 25/772* (2023.01)

(56) References Cited

U.S. PATENT DOCUMENTS

| | | |
|---|---|---|
| 6,624,849 B1 | 9/2003 | Nomura |
| 2013/0075590 A1* | 3/2013 | Compton ............. H04N 5/3532 250/208.1 |
| 2015/0062394 A1* | 3/2015 | Ikeda .................... H04N 5/347 348/301 |
| 2015/0071564 A1* | 3/2015 | Sasaki .................. H04N 5/3675 382/275 |
| 2018/0167575 A1 | 6/2018 | Watanabe et al. |

FOREIGN PATENT DOCUMENTS

| | | |
|---|---|---|
| JP | 2014-003462 A | 1/2014 |
| JP | 2017-535999 A | 11/2017 |
| WO | 2017/013806 A1 | 1/2017 |

* cited by examiner

FIG.14A
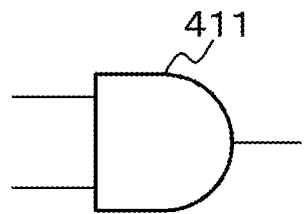
AND CIRCUIT
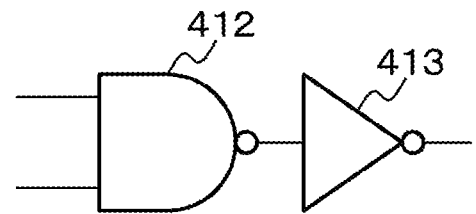
AND CIRCUIT AND INVERTER CIRCUIT
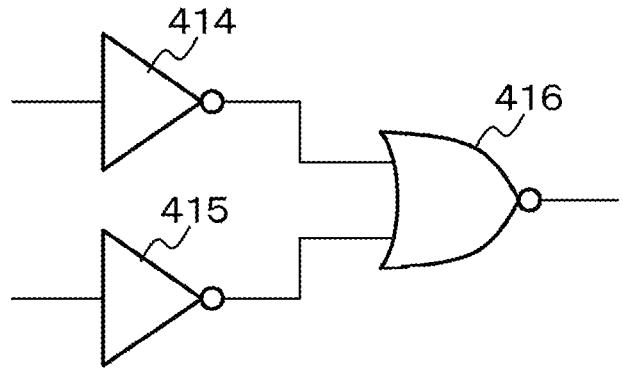
TWO INVERTER CIRCUITS AND NOR CIRCUIT
FIG.14B
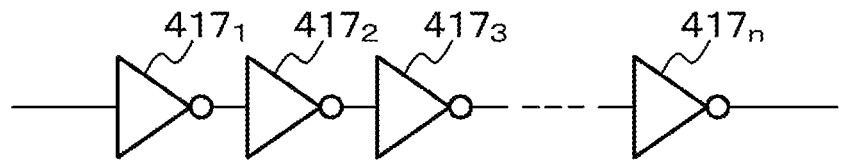

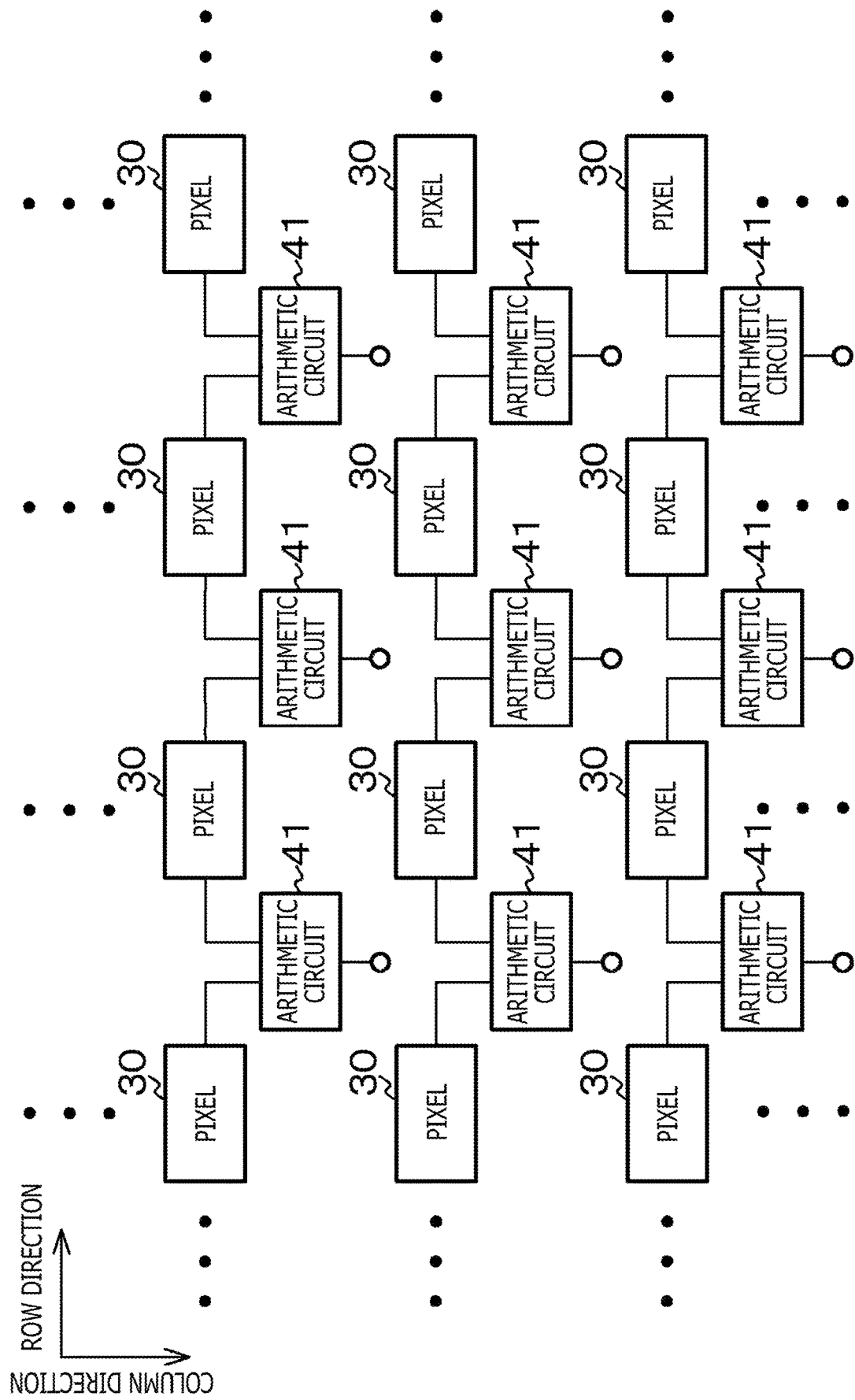

IMAGING DEVICE AND ELECTRONIC EQUIPMENT

CROSS REFERENCE TO RELATED APPLICATIONS

This application is a U.S. National Phase of International Patent Application No. PCT/JP2019/040590 filed on Oct. 16, 2019, which claims priority benefit of Japanese Patent Application No. JP 2018-197188 filed in the Japan Patent Office on Oct. 19, 2018 and also claims priority benefit of Japanese Patent Application No. JP 2019-181896 filed in the Japan Patent Office on Oct. 2, 2019. Each of the above-referenced applications is hereby incorporated herein by reference in its entirety.

Technical Field

The present disclosure relates to an imaging device and electronic equipment.

Background Art

As a type of event-driven imaging devices, asynchronous imaging devices called "DVS (Dynamic Vision Sensor)" have been proposed (for example, see PTL 1). An asynchronous imaging device acquires, only when an event (for example, incident) occurs in a scene, data of portions having changes in luminance level due to the event. Thus, the asynchronous imaging device can acquire image data at a speed much higher than a general synchronous imaging device configured to unnecessarily acquire data of all images at a fixed frame rate.

CITATION LIST

Patent Literature

[PTL 1]
  JP-T-2017-535999

SUMMARY

Technical Problem

The asynchronous imaging device originally acquires, when an event (hereinafter sometimes referred to as "true event") occurs in a scene, data due to the occurrence of the true event. However, the asynchronous imaging device needlessly acquires data in a case where the potential of a luminance sensing section changes due to a noise event such as sensor noise even if no event occurs in a scene.

Accordingly, it is an object of the present disclosure to provide an imaging device configured to soften the effects of noise events such as sensor noise, thereby being capable of acquiring data only when true events occur, and electronic equipment including the imaging device.

Solution to Problem

In order to achieve the above-mentioned object, according to the present disclosure, there is provided an imaging device including:
  a plurality of pixels each including a light receiving element configured to perform photoelectric conversion on incident light to generate an electrical signal, the pixels each being configured to output a detection signal when detecting that an amount of change of the electrical signal exceeds a predetermined threshold; and
  a control section configured to read out, when pixels of a pixel combination of two or more pixels including a pixel of interest both output detection signals, the detection signals.

In order to achieve the above-mentioned object, according to the present disclosure, there is provided electronic equipment including the imaging device including the plurality of pixels and the control section that have the above-mentioned configurations.

BRIEF DESCRIPTION OF DRAWINGS

FIG. 14A is a block diagram illustrating circuit examples of a logic circuit of a control section. FIG. 14B is a block diagram illustrating a circuit example of a delay circuit of the control section.

FIG. 15 is a block diagram illustrating the configuration of the main part of a pixel array section according to Embodiment 1.

DESCRIPTION OF EMBODIMENTS

Figure 1:
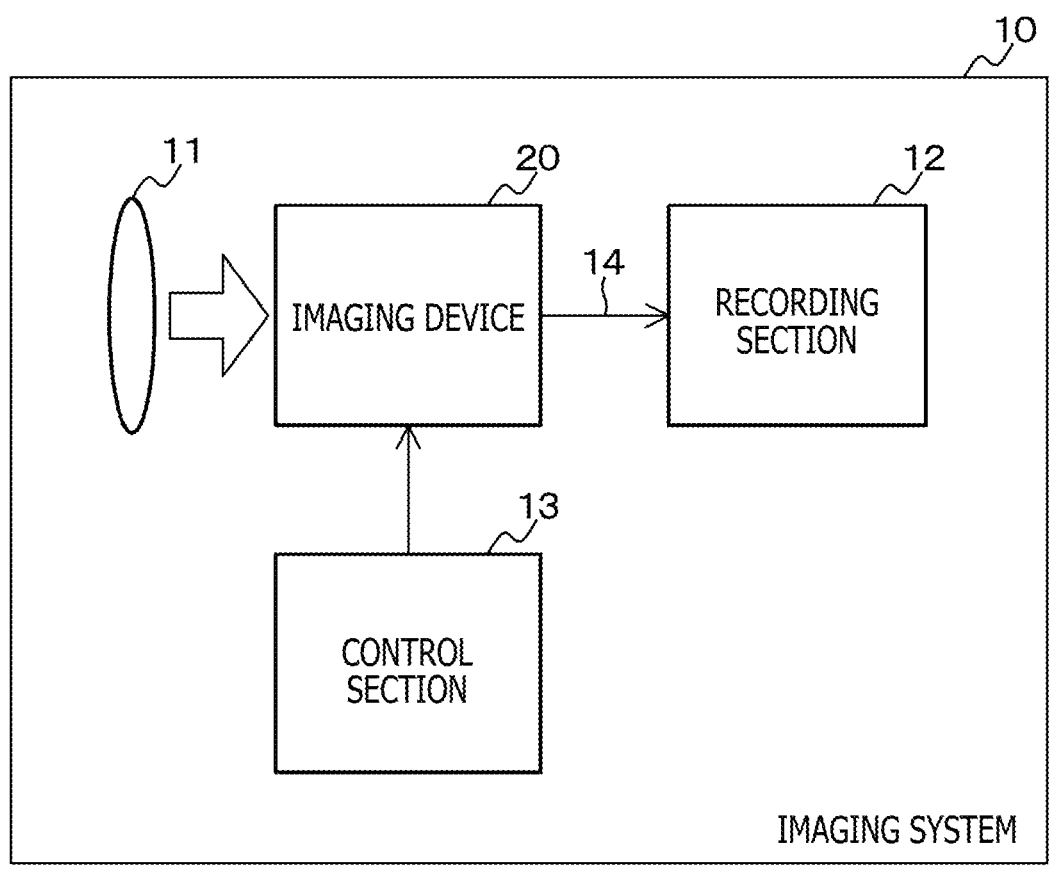
FIG. 1 is a block diagram illustrating an example of a system configuration of an imaging system to which the technology according to the present disclosure is applied.

Now, modes for carrying out the technology according to the present disclosure (hereinafter referred to as "embodiment") are described in detail with reference to the drawings. The technology according to the present disclosure is not limited to the embodiments. In the following description, the same elements or elements having the same functions are denoted by the same reference symbols, and the overlapping description thereof is omitted. Note that, the following items are described in order.
1. General description of imaging device and electronic equipment of present disclosure
2. Imaging system to which technology according to present disclosure is applied
   2-1. Configuration example of imaging system
   2-2. Imaging device according to first configuration example (arbiter type)
      2-2-1. Configuration example of pixel array section
      2-2-2. Circuit configuration example of pixel
      2-2-3. First example of address event detecting section
      2-2-4. Configuration example of current-to-voltage converting section
      2-2-5. Configuration examples of subtractor and quantizer
      2-2-6. Second configuration example of address event detecting section
   2-3. Imaging device according to second configuration example (scan type)
   2-4. Configuration example of chip structure
   2-5. Configuration example of column processing section
   2-6. Noise event
3. Imaging device of present disclosure
   3-1. Embodiment 1 (example in which arithmetic circuit is shared by two pixels adjacent to each other in one direction in matrix arrangement)
   3-2. Embodiment 2 (example in which arithmetic circuit is shared by two pixels adjacent to each other in one of two directions in matrix arrangement)
   3-3. Embodiment 3 (modified example of Embodiment 1: example of case including color filter having RGB Bayer array)
   3-4. Embodiment 4 (modified example of Embodiment 2: example of case including color filter having RGB Bayer array)
4. Modified example
5. Application examples of technology according to present disclosure (examples of application to moving bodies)
6. Configurations that present disclosure can take <General Description of Imaging Device and Electronic Equipment of Present Disclosure>

In an imaging device and electronic equipment of the present disclosure, a control section can reset a pixel of interest in a case where the pixel of interest outputs a detection signal but a pixel associated with the pixel of interest outputs no detection signal within a certain period.

In the imaging device and electronic equipment of the present disclosure having the preferred configuration described above, the pixel combination can include a combination of the pixel of interest and a pixel adjacent to the pixel of interest in one direction in the matrix arrangement of a plurality of pixels, or a combination of the pixel of interest and a pixel adjacent to the pixel of interest in two directions in the matrix arrangement of the plurality of pixels.

Alternatively, in the imaging device and electronic equipment of the present disclosure having the preferred configuration described above, the pixel combination can include a combination of the pixel of interest and a pixel adjacent to the pixel of interest with one pixel interposed therebetween in one direction in the matrix arrangement of the plurality of pixels, or a combination of the pixel of interest and a pixel adjacent to the pixel of interest with one pixel interposed therebetween in two directions in the matrix arrangement of the plurality of pixels.

Further, in the imaging device and electronic equipment of the present disclosure having the preferred configuration described above, the control section can include an arithmetic circuit configured to perform a logical operation of detection signals output from pixels of a pixel combination of two or more pixels. Further, in the imaging device and electronic equipment, the arithmetic circuit can include an AND circuit, a combination of a NAND circuit and an inverter circuit, or a combination of two inverter circuits and a NOR circuit.

Further, the imaging device of the present disclosure can include a plurality of pixels each including a light receiving element configured to perform photoelectric conversion on incident light to generate an electrical signal, the pixels each being configured to output a detection signal when detecting that the amount of change of the electrical signal exceeds a predetermined threshold, and a control section connected to a first pixel and a second pixel adjacent to each other in at least one direction in the matrix arrangement of the plurality of pixels, and configured to read out, when the first pixel and the second pixel both output detection signals, the detection signals. Further, when a color filter is arranged on the plurality of pixels, the first pixel and the second pixel can be same color pixels.

<Imaging System to which Technology according to Present Disclosure is Applied>

[Configuration Example of Imaging System]

FIG. 1 is a block diagram illustrating an example of a system configuration of an imaging system to which the technology according to the present disclosure is applied.

As illustrated in FIG. 1, an imaging system 10 to which the technology according to the present disclosure is applied includes an imaging lens 11, an imaging device 20, a recording section 12, and a control section 13. The imaging system 10 is an example of electronic equipment of the present disclosure, and examples of the electronic equipment include camera systems that are installed on industrial robots and vehicle-mounted camera systems.

In the imaging system 10 having the above-mentioned configuration, the imaging lens 11 captures incident light from an object to form an image on the image plane of the imaging device 20. The imaging device 20 performs photoelectric conversion in pixels on incident light captured by the imaging lens 11 to acquire image data. As the imaging device 20, an imaging device of the present disclosure described later is used.

The imaging device 20 executes predetermined signal processing such as image recognition processing on the imaged image data, and outputs, to the recording section 12, the processing result and data indicating address event detection signals (hereinafter sometimes simply referred to as "detection signal") described later. A method of generating address event detection signals is described later. The recording section 12 stores data supplied from the imaging device 20 through a signal line 14. The control section 13 includes, for example, a microcomputer, and controls the imaging operation of the imaging device 20.

[Imaging Device according to First Configuration Example (Arbiter Type)]

Figure 2:
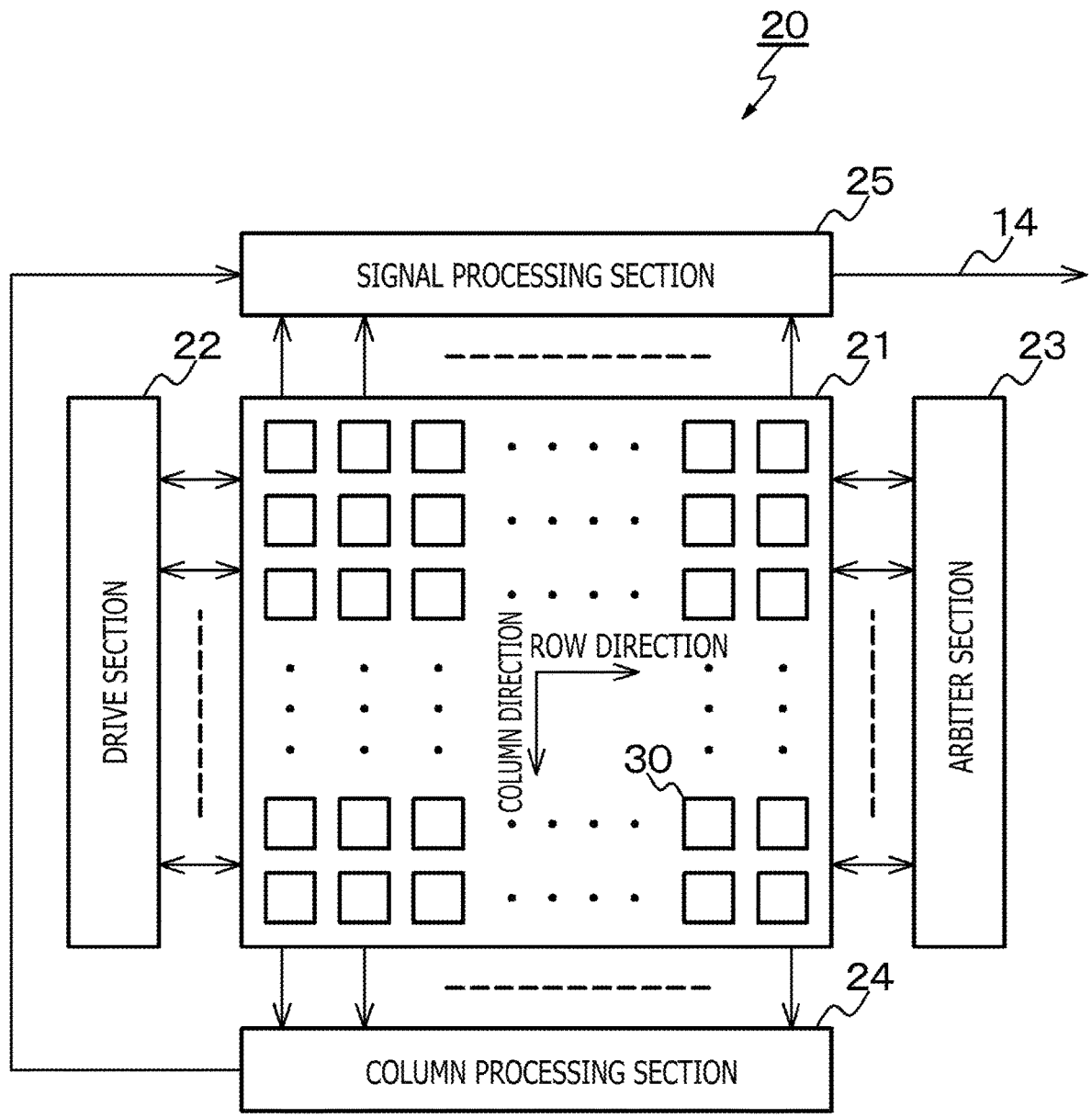
FIG. 2 is a block diagram illustrating an example of the configuration of an imaging device according to a first configuration example of the present disclosure.

FIG. 2 is a block diagram illustrating an example of the configuration of an imaging device according to a first configuration example that is used as the imaging device 20 in the imaging system 10 to which the technology according to the present disclosure is applied.

As illustrated in FIG. 2, the imaging device 20 according to the first configuration example, which serves as the imaging device of the present disclosure, is an asynchronous imaging device called "DVS," and includes a pixel array section 21, a drive section 22, an arbiter section 23, a column processing section 24, and a signal processing section 25.

In the imaging device 20 having the above-mentioned configuration, in the pixel array section 21, a plurality of pixels 30 is two-dimensionally arrayed in a matrix (in an array). In the pixel matrix array, for each pixel column, a vertical signal line VSL described later is formed.

The plurality of pixels 30 each generates, as a pixel signal, an analog signal having a voltage corresponding to a photocurrent. Further, the plurality of pixels 30 each detects the presence or absence of an address event on the basis of whether the amount of photocurrent change exceeds a predetermined threshold or not. Then, when an address event occurs, the pixel 30 outputs a request to the arbiter section 23.

The drive section 22 drives the plurality of pixels 30 so that the pixels 30 output, to the column processing section 24, pixel signals generated by the pixels 30.

The arbiter section 23 arbitrates requests from the plurality of pixels 30, and transmits responses based on the arbitration result to the pixels 30. When receiving the response from the arbiter section 23, the pixel 30 supplies a detection signal indicating a detection result (address event detection signal) to the drive section 22 and the signal processing section 25. Detection signals from the pixels 30 in a plurality of rows can be read out at once.

The column processing section 24 includes, for example, an analog-to-digital converter, and performs, in each pixel column of the pixel array section 21, the processing of converting analog pixel signals output from the pixels 30 in a column into digital signals. Then, the column processing section 24 supplies the digital signals after the analog-to-digital conversion to the signal processing section 25.

The signal processing section 25 executes, on digital signals supplied from the column processing section 24, predetermined signal processing such as CDS (Correlated Double Sampling) processing and image recognition processing. Then, the signal processing section 25 supplies data indicating the processing result and detection signals supplied from the arbiter section 23 to the recording section 12 (see FIG. 1) through the signal line 14.

[Configuration Example of Pixel Array Section]

Figure 3:
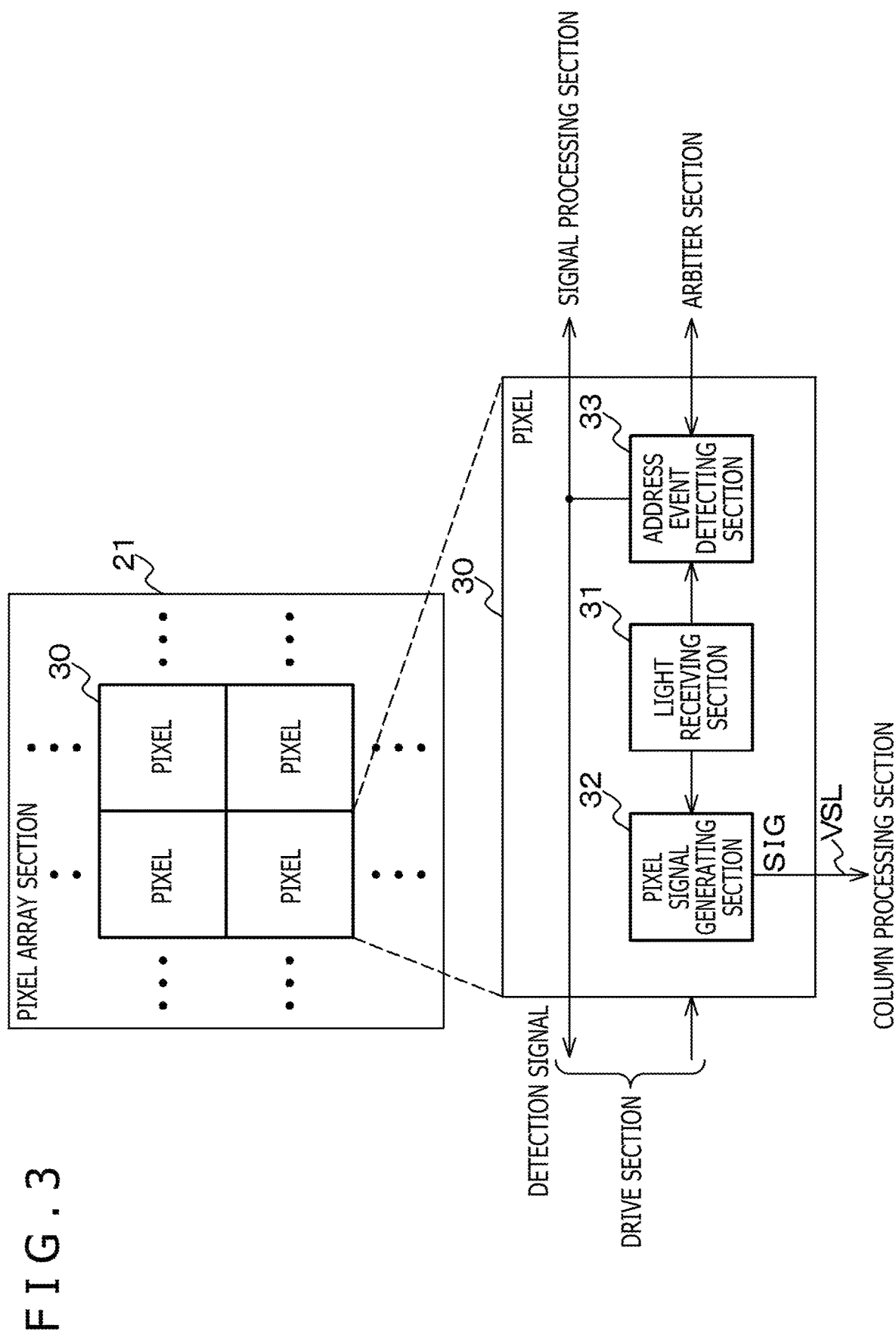
FIG. 3 is a block diagram illustrating an example of the configuration of a pixel array section.

FIG. 3 is a block diagram illustrating an example of the configuration of the pixel array section 21.

In the pixel array section 21 in which the plurality of pixels 30 is two-dimensionally arrayed in a matrix, the plurality of pixels 30 each includes a light receiving section 31, a pixel signal generating section 32, and an address event detecting section 33.

In the pixel 30 having the above-mentioned configuration, the light receiving section 31 performs photoelectric conversion on incident light to generate a photocurrent. Then, the light receiving section 31 supplies, under control of the drive section 22 (see FIG. 2), the photocurrent, which has been generated by the photoelectric conversion, to one of the pixel signal generating section 32 and the address event detecting section 33.

The pixel signal generating section 32 generates, as a pixel signal SIG, a signal having a voltage corresponding to a photocurrent supplied from the light receiving section 31, and supplies the generated pixel signal SIG to the column processing section 24 (see FIG. 2) through the vertical signal line VSL.

The address event detecting section 33 detects the presence or absence of an address event on the basis of whether the amount of change of a photocurrent from the light receiving section 31 exceeds the predetermined threshold or not. Examples of the address event include on events indicating that the amount of change of a photocurrent exceeds an upper limit threshold and off events indicating that the amount of change falls below a lower limit threshold. Further, examples of the address event detection signals include 1 bit indicating the detection of on events, and 1 bit indicating the detection of off events. Note that, the address event detecting section 33 can also be configured to only detect on events.

When an address event occurs, the address event detecting section 33 supplies, to the arbiter section 23 (see FIG. 2), a request for requesting the transmission of an address event detection signal. Then, when receiving a response to the request from the arbiter section 23, the address event detecting section 33 supplies the address event detection signal to the drive section 22 and the signal processing section 25.

[Circuit Configuration Example of Pixel]

Figure 4:
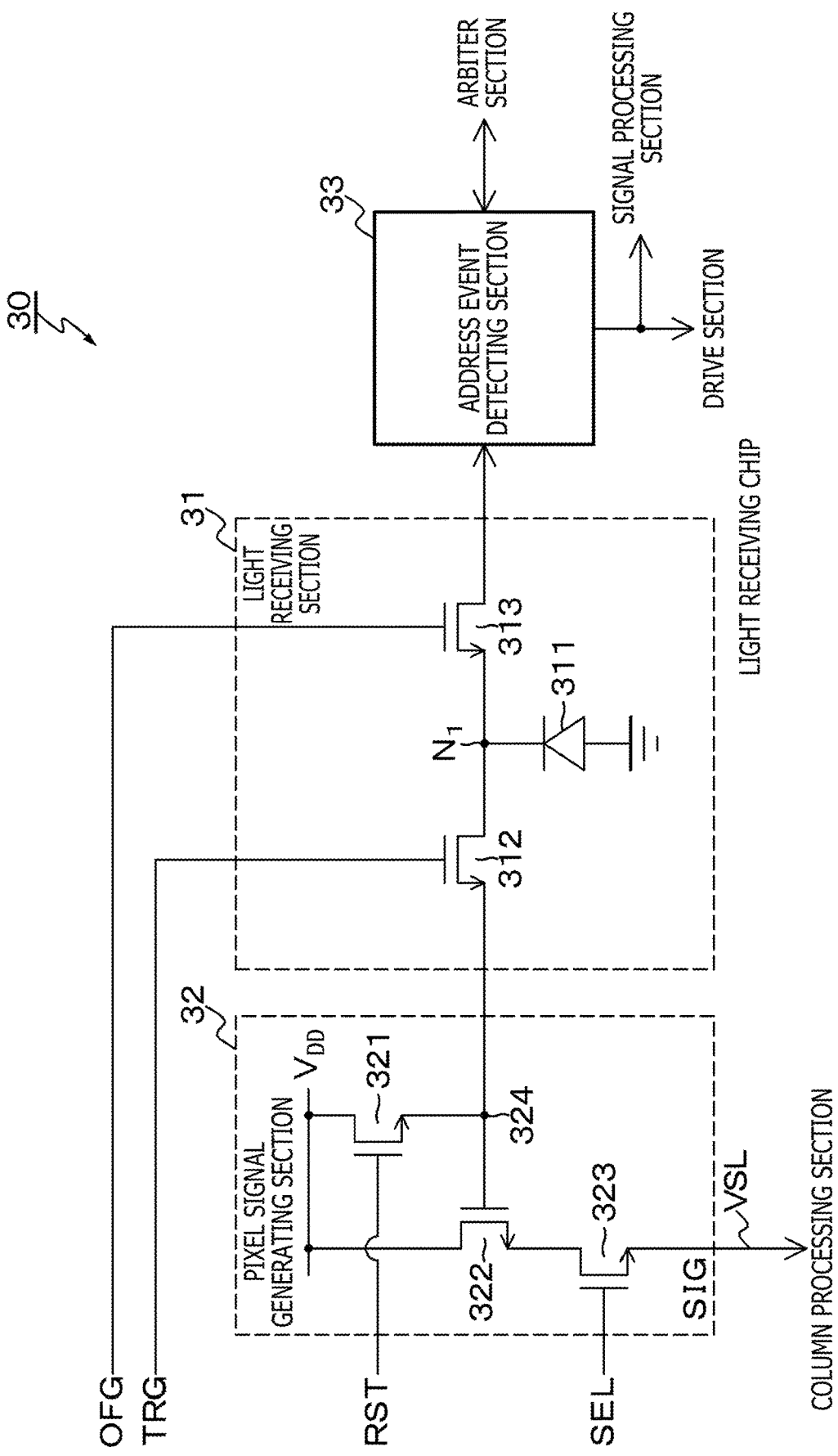
FIG. 4 is a circuit diagram illustrating an example of the circuit configuration of a pixel.

FIG. 4 is a circuit diagram illustrating an example of the circuit configuration of the pixel 30. As described above, the plurality of pixels 30 each includes the light receiving section 31, the pixel signal generating section 32, and the address event detecting section 33.

In the pixel 30 having the above-mentioned configuration, the light receiving section 31 includes a light receiving element (photoelectric conversion element) 311, a transfer transistor 312, and an OFG (Over Flow Gate) transistor 313. As the transfer transistor 312 and the OFG transistor 313, for example, N-type MOS (Metal Oxide Semiconductor) transistors are used. The transfer transistor 312 and the OFG transistor 313 are connected in series to each other.

The light receiving element 311 is connected between a common connection node $N_1$ of the transfer transistor 312 and the OFG transistor 313, and the ground. The light receiving element 311 performs photoelectric conversion on incident light to generate charges by a charge amount corresponding to the light intensity of the incident light.

To the gate electrode of the transfer transistor 312, a transfer signal TRG is supplied from the drive section 22 illustrated in FIG. 2. The transfer transistor 312 supplies, in response to the transfer signal TRG, charges obtained through photoelectric conversion by the light receiving element 311 to the pixel signal generating section 32.

To the gate electrode of the OFG transistor 313, a control signal OFG is supplied from the drive section 22. The OFG transistor 313 supplies, in response to the control signal OFG, an electrical signal generated by the light receiving element 311 to the address event detecting section 33. The electrical signal that is supplied to the address event detecting section 33 is a photocurrent with charges.

The pixel signal generating section 32 includes a reset transistor 321, an amplification transistor 322, a selection transistor 323, and a floating diffusion layer 324. As the reset transistor 321, the amplification transistor 322, and the selection transistor 323, for example, N-type MOS transistors are used.

To the pixel signal generating section 32, charges obtained through photoelectric conversion by the light receiving element 311 are supplied from the light receiving section 31 by the transfer transistor 312. The charges that are supplied from the light receiving section 31 are accumulated in the floating diffusion layer 324. The floating diffusion layer 324 generates a voltage signal having a voltage value corresponding to the amount of accumulated charges. That is, the floating diffusion layer 324 converts charges into voltage.

The reset transistor 321 is connected between a power line for a power supply voltage VDD and the floating diffusion layer 324. To the gate electrode of the reset transistor 321, a reset signal RST is supplied from the drive section 22. The reset transistor 321 initializes (resets), in response to the reset signal RST, the amount of charges in the floating diffusion layer 324.

The amplification transistor 322 is connected in series to the selection transistor 323 between the power line for the power supply voltage VDD and the vertical signal line VSL. The amplification transistor 322 amplifies voltage signals obtained through charge-to-voltage conversion by the floating diffusion layer 324.

To the gate electrode of the selection transistor 323, a selection signal SEL is supplied from the drive section 22. The selection transistor 323 outputs, in response to the selection signal SEL, a voltage signal amplified by the amplification transistor 322 to the column processing section 24 (see FIG. 2) as the pixel signal SIG through the vertical signal line VSL.

In the imaging device 20 including the pixel array section 21 in which the pixels 30 having the above-mentioned configuration are two-dimensionally arranged, when being instructed to start address event detection by the control section 13, which is illustrated in FIG. 1, the drive section 22 supplies the control signal OFG to the OFG transistor 313 of the light receiving section 31 to drive the OFG transistor 313 so that the OFG transistor 313 supplies a photocurrent to the address event detecting section 33.

Further, when an address event is detected in a certain pixel 30, the drive section 22 turns off the OFG transistor 313 of the pixel 30 in question to stop the supply of a photocurrent to the address event detecting section 33. Next, the drive section 22 supplies the transfer signal TRG to the transfer transistor 312 to drive the transfer transistor 312 so that the transfer transistor 312 transfers charges obtained through photoelectric conversion by the light receiving element 311 to the floating diffusion layer 324.

The imaging device 20 including the pixel array section 21, in which the pixels 30 having the above-mentioned configuration are two-dimensionally arranged in this way, outputs, to the column processing section 24, only pixel signals from the pixels 30 in which address events have been detected. With this, as compared to the case where pixel signals from all pixels are output irrespective of the presence or absence of address events, the power consumption and processing amount of image processing of the imaging device 20 can be reduced.

Note that, the configuration of the pixel 30 exemplified herein is an example, and the pixel 30 is not limited to this configuration example. For example, the pixel 30 can have a pixel configuration without the pixel signal generating section 32. In the case of this pixel configuration, it is only necessary that, in the light receiving section 31, the OFG transistor 313 be omitted and the transfer transistor 312 have the function of the OFG transistor 313.

[First Configuration Example of Address Event Detecting Section]

Figure 5:
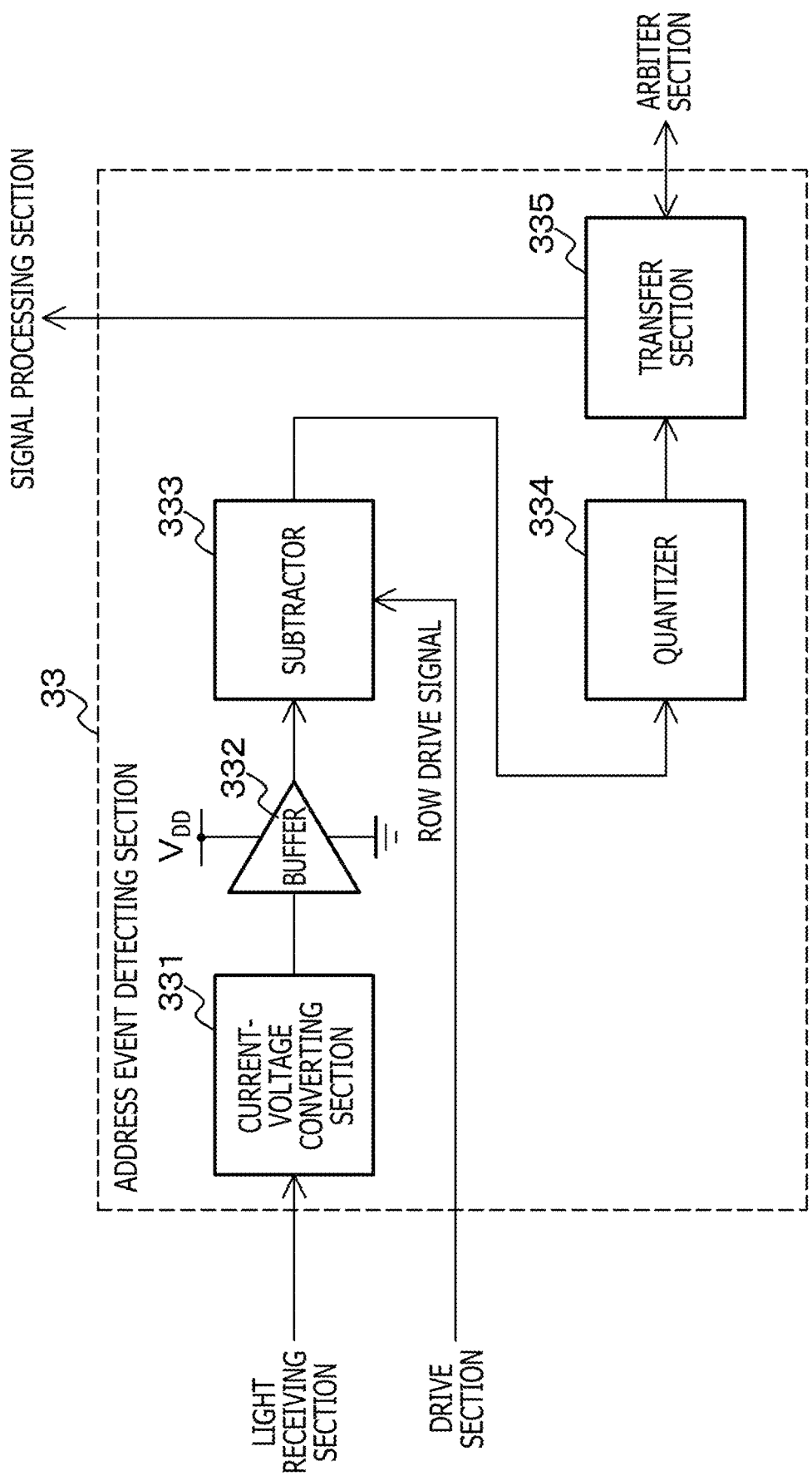
FIG. 5 is a block diagram illustrating a first configuration example of an address event detecting section.

FIG. 5 is a block diagram illustrating a first configuration example of the address event detecting section 33. As illustrated in FIG. 5, the address event detecting section 33 according to this configuration example includes a current-to-voltage converting section 331, a buffer 332, a subtractor 333, a quantizer 334, and a transfer section 335.

The current-to-voltage converting section 331 converts a photocurrent from the light receiving section 33 of the pixel 30 into a voltage signal corresponding to the logarithm of the photocurrent. The current-to-voltage converting section 331 supplies the voltage signal obtained through the conversion to the buffer 332. The buffer 332 buffers a voltage signal supplied from the current-to-voltage converting section 331, and supplies the resultant to the subtractor 333.

To the subtractor 333, a row drive signal is supplied from the drive section 22. The subtractor 333 lowers, in response to the row drive signal, the level of a voltage signal supplied from the buffer 332. Then, the subtractor 333 supplies the voltage signal at the lowered level to the quantizer 334. The quantizer 334 quantizes a voltage signal supplied from the subtractor 333 into a digital signal, and outputs the digital signal to the transfer section 335 as an address event detection signal.

The transfer section 335 transfers an address event detection signal supplied from the quantizer 334 to the arbiter section 23 and the like. When an address event is detected, the transfer section 335 supplies, to the arbiter section 23, a request for requesting the transmission of an address event detection signal. Then, when receiving a response to the request from the arbiter section 23, the transfer section 335 supplies the address event detection signal to the drive section 22 and the signal processing section 25.

Subsequently, configuration examples of the current-to-voltage converting section 331, the subtractor 333, and the quantizer 334 of the address event detecting section 33 are described.

[Configuration Example of Current-to-Voltage Converting Section]

Figure 6:
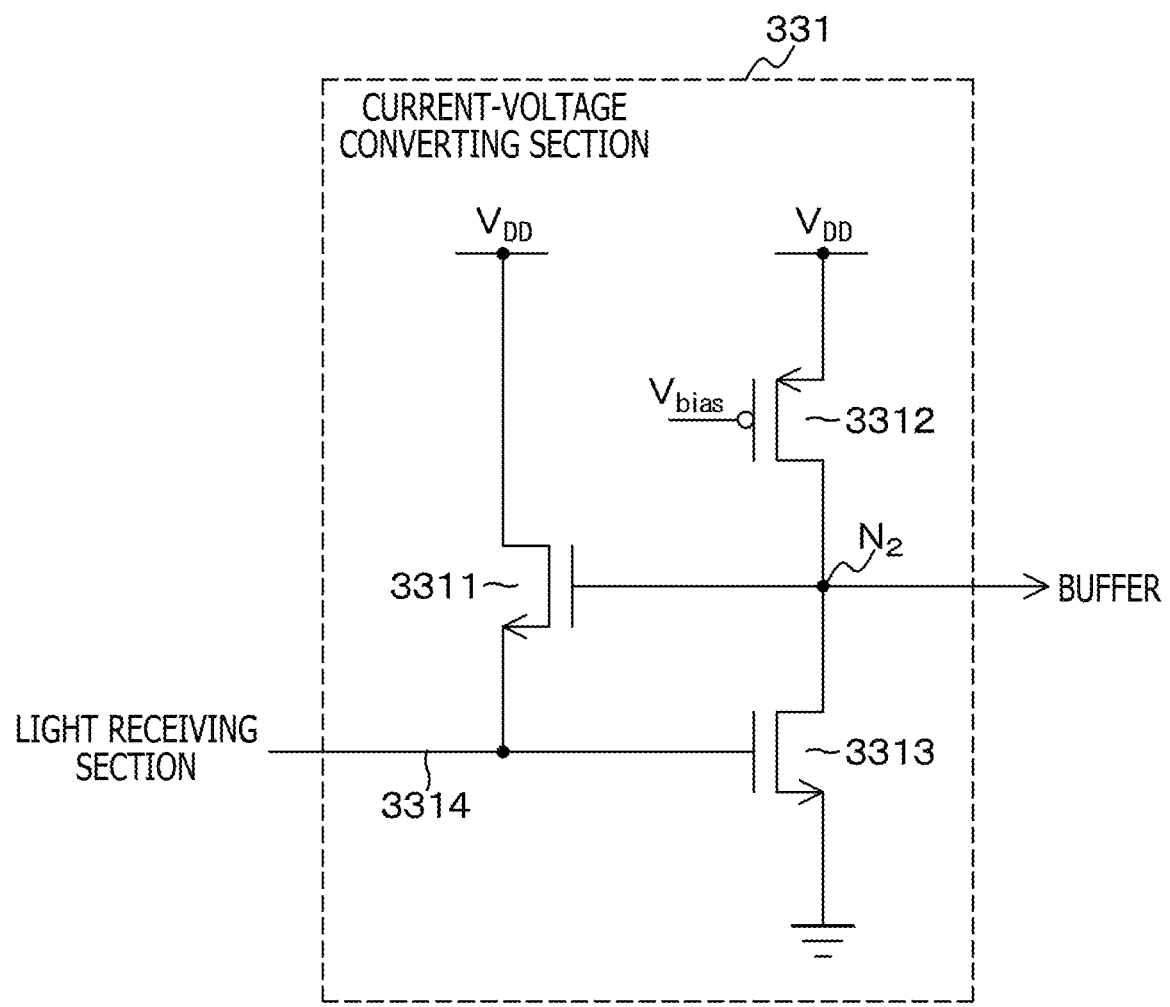
FIG. 6 is a circuit diagram illustrating an example of the configuration of a current-to-voltage converting section of the address event detecting section.

FIG. 6 is a circuit diagram illustrating an example of the configuration of the current-to-voltage converting section 331 of the address event detecting section 33. As illustrated in FIG. 6, the current-to-voltage converting section 331 according to this example has a circuit configuration including an N-type transistor 3311, a P-type transistor 3312, and an N-type transistor 3313. As the transistors 3311 to 3313, for example, MOS transistors are used.

The N-type transistor 3311 is connected between the power line for the power supply voltage VDD and a signal input line 3314. The P-type transistor 3312 and the N-type transistor 3313 are connected in series between the power line for the power supply voltage VDD and the ground. Further, to a common connection node N2 of the P-type transistor 3312 and the N-type transistor 3313, the gate electrode of the N-type transistor 3311 and the input terminal of the buffer 332 illustrated in FIG. 5 are connected.

To the gate electrode of the P-type transistor 3312, a predetermined bias voltage $V_{bias}$ is applied. With this, the P-type transistor 3312 supplies a constant current to the N-type transistor 3313. To the gate electrode of the N-type transistor 3313, photocurrents are input from the light receiving section 31 through the signal input line 3314.

The N-type transistor 3311 and the N-type transistor 3313 have drain electrodes connected on the power supply side.

Such circuits are called "source follower." With the two source followers connected in a loop, a photocurrent from the light receiving section 31 is converted into a voltage signal corresponding to the logarithm of the photocurrent.
(Configuration Examples of Subtractor and Quantizer)

Figure 7:
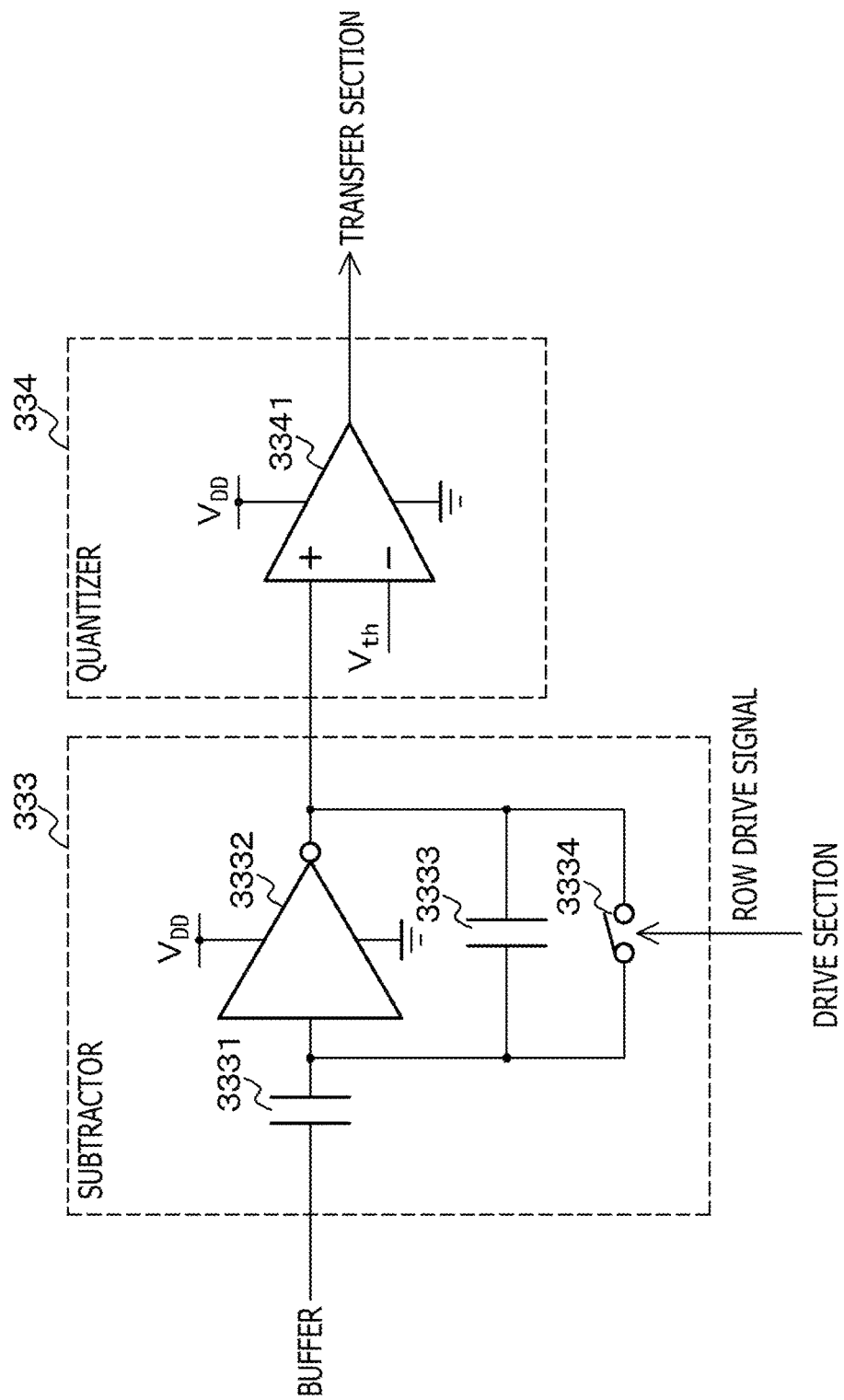
FIG. 7 is a circuit diagram illustrating examples of the configurations of a subtractor and a quantizer of the address event detecting section.

FIG. 7 is a circuit diagram illustrating examples of the configurations of the subtractor 333 and the quantizer 334 of the address event detecting section 33.

The subtractor 333 according to this example includes a capacitive element 3331, an inverter circuit 3332, a capacitive element 3333, and a switch element 3334.

The capacitive element 3331 has one end connected to the output terminal of the buffer 332 illustrated in FIG. 5, and the other end connected to the input terminal of the inverter circuit 3332. The capacitive element 3333 is connected in parallel to the inverter circuit 3332. The switch element 3334 is connected between the ends of the capacitive element 3333. To the switch element 3334, a row drive signal is supplied from the drive section 22 as an open/close control signal for the switch element 3334. The switch element 3334 opens/closes, in response to the row drive signal, a path connecting the ends of the capacitive element 3333. The inverter circuit 3332 inverts the polarity of a voltage signal input through the capacitive element 3331.

In the subtractor 333 having the above-mentioned configuration, when the switch element 3334 is turned on (closed), a voltage signal $V_{init}$ is input to the terminal on the buffer 332 side of the capacitive element 3331, and the other terminal serves as a virtual ground terminal. The potential of the virtual ground terminal is assumed to be zero for the sake of convenience. Here, a charge $Q_{init}$ accumulated in the capacitive element 3331 is expressed by Expression (1) where $C_1$ denotes the capacitance value of the capacitive element 3331. Meanwhile, since the ends of the capacitive element 3333 are short-circuited, no charge is accumulated in the capacitive element 3333.

$$Q_{init} = C_1 \times V_{init} \quad (1)$$

Next, a case where the switch element 3334 is turned off (opened), and a voltage across the terminal on the buffer 332 side of the capacitive element 3331 changes to $V_{after}$ is considered. A charge $Q_{after}$ that is accumulated in the capacitive element 3331 is expressed by Expression (2).

$$Q_{after} = C_1 \times V_{after} \quad (2)$$

Meanwhile, a charge $Q_2$ that is accumulated in the capacitive element 3333 is expressed by Expression (3) where $C_2$ denotes the capacitance value of the capacitive element 3333 and $V_{out}$ denotes an output voltage.

$$Q_2 = C_2 \times V_{out} \quad (3)$$

Here, since the total amount of charges in the capacitive element 3331 and the capacitive element 3333 does not change, Expression (4) is satisfied.

$$Q_{init} = Q_{after} + Q_2 \quad (4)$$

When Expression (1) to Expression (3) are substituted for Expression (4) to be transformed, Expression (5) is obtained.

$$V_{out} = -(C_1/C_2) \times (V_{after} - V_{init}) \quad (5)$$

Expression (5) expresses the subtraction operation of a voltage signal, and the gain of the subtraction result is $C_1/C_2$. Since a gain is desirably maximized in general, $C_1$ is preferably set to a large value and $C_2$ is preferably set to a small value. Meanwhile, when $C_2$ is too small, kTC noise increases, with the result that the noise characteristics may deteriorate. Thus, $C_2$ can only be reduced in a range that achieves acceptable noise. Further, since the pixels 30 each include the address event detecting section 33 including the subtractor 333, the capacitive element 3331 and the capacitive element 3333 have space constraints. In consideration of these matters, the capacitance values $C_1$ and $C_2$ of the capacitive elements 3331 and 3333 are determined.

In FIG. 7, the quantizer 334 includes a comparator 3341. The comparator 3341 receives an output signal of the inverter circuit 3332, that is, a voltage signal from the subtractor 430 as non-inverting (+) input, and a predetermined threshold voltage $V_{th}$ as inverting (−) input. Then, the comparator 3341 compares the voltage signal from the subtractor 430 to the predetermined threshold voltage $V_{th}$, and outputs, to the transfer section 335, a signal indicating the comparison result as an address event detection signal.
[Second Configuration Example of Address Event Detecting Section]

Figure 8:
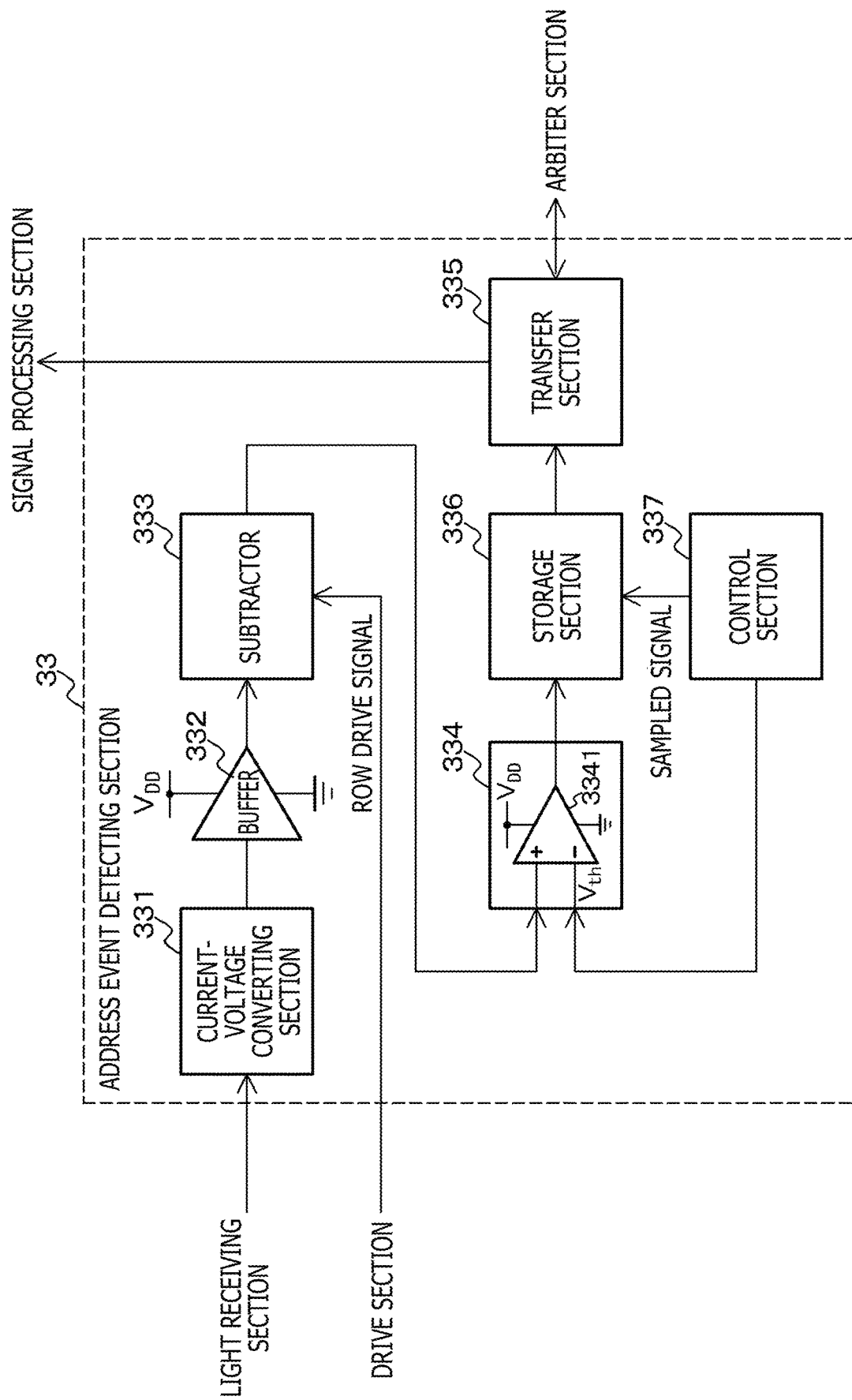
FIG. 8 is a block diagram illustrating a second configuration example of the address event detecting section.

FIG. 8 is a block diagram illustrating a second configuration example of the address event detecting section 33. As illustrated in FIG. 8, the address event detecting section 33 according to the configuration example includes a storage section 336 and a control section 337 in addition to the current-to-voltage converting section 331, the buffer 332, the subtractor 333, the quantizer 334, and the transfer section 335.

The storage section 336 is provided between the quantizer 334 and the transfer section 335, and accumulates, in response to sampled signals supplied from the control section 337, output of the quantizer 334, that is, results of comparison by the comparator 3341. The storage section 336 may be a sampling circuit such as a switch, plastics, or a capacitor, or a digital memory circuit such as a latch or a flip-flop.

The control section 337 supplies the predetermined threshold voltage $V_{th}$ to the inverting (−) input terminal of the comparator 3341. The voltage value of the threshold voltage $V_{th}$ that is supplied from the control section 337 to the comparator 3341 may change in a time-division manner. For example, the control section 337 supplies a threshold voltage $V_{th1}$ corresponding to on events indicating that the amount of change of a photocurrent exceeds the upper limit threshold and a threshold voltage $V_{th2}$ corresponding to off events indicating that the amount of change falls below the lower limit threshold at different timings so that one comparator 3341 can detect a plurality of types of address events.

The storage section 336 may accumulate results of comparison by the comparator 3341 using the threshold voltage $V_{th1}$ corresponding to on events in, for example, a period during which the threshold voltage $V_{th2}$ corresponding to off events is supplied from the control section 337 to the inverting (−) input terminal of the comparator 3341. Note that, the storage section 336 may be provided inside the pixel 30 or outside the pixel 30. Further, the storage section 336 is not an essential component of the address event detecting section 33. That is, the storage section 336 may be omitted.
[Imaging Device According to Second Configuration Example (Scan Type)]

The imaging device 20 according to the first configuration example described above is the asynchronous imaging device configured to read out events by the asynchronous readout system. However, the event readout system is not limited to the asynchronous readout system and may be the synchronous readout system. An imaging device to which the synchronous readout system is applied is a scan type imaging device that is the same as a general imaging device configured to perform imaging at a predetermined frame rate.

Figure 9:
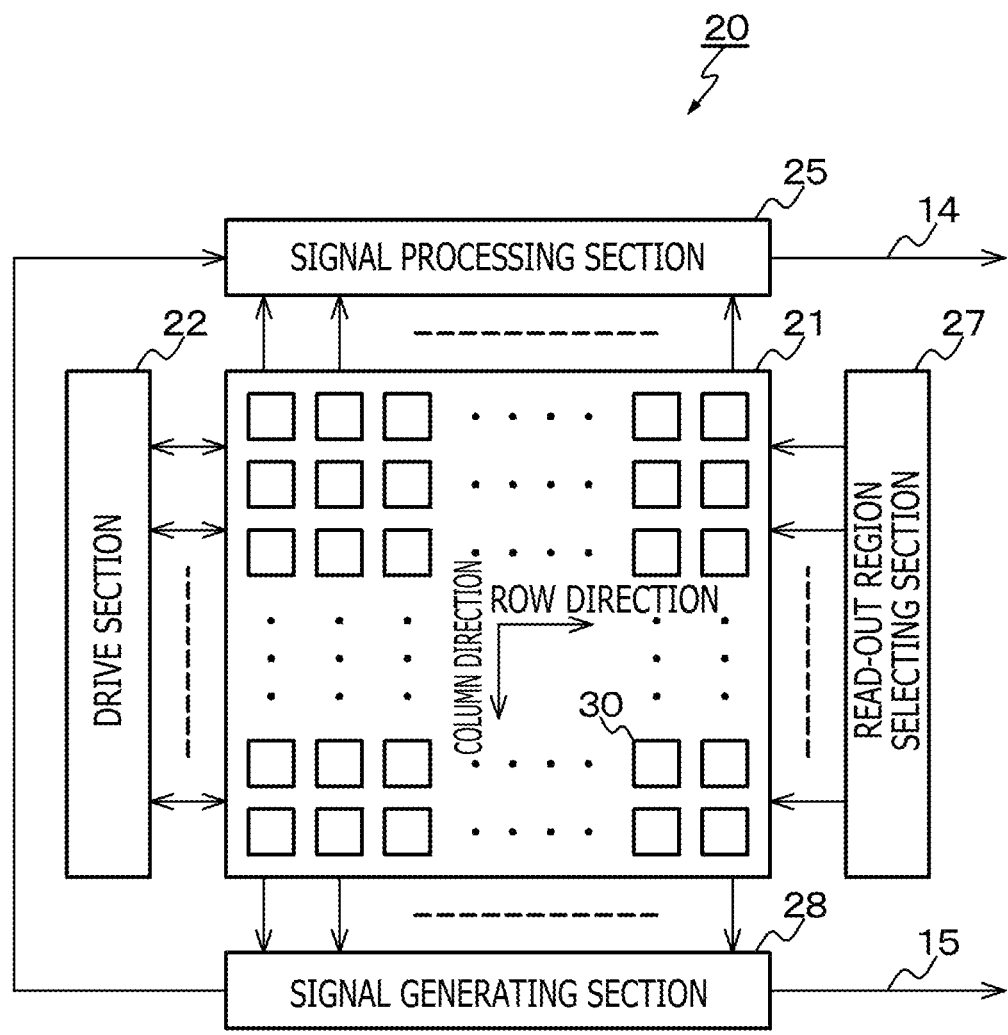
FIG. 9 is a block diagram illustrating an example of the configuration of an imaging device according to a second configuration example of the present disclosure.

FIG. 9 is a block diagram illustrating an example of the configuration of an imaging device according to a second configuration example that is used as the imaging device 20 in the imaging system 10 to which the technology according to the present disclosure is applied, that is, a scan type imaging device.

As illustrated in FIG. 9, the imaging device 20 according to the second configuration example, which serves as the imaging device of the present disclosure, includes the pixel array section 21, the drive section 22, the signal processing section 25, a read-out region selecting section 27, and a signal generating section 28.

The pixel array section 21 includes the plurality of pixels 30. The plurality of pixels 30 each outputs an output signal in response to a selection signal from the read-out region selecting section 27. The plurality of pixels 30 can each also contain, for example, a comparator as illustrated in FIG. 7. The plurality of pixels 30 outputs signals corresponding to the amounts of change of the intensity of light. The plurality of pixels 30 may be two-dimensionally arranged in a matrix as illustrated in FIG. 9.

The drive section 22 drives the plurality of pixels 30 so that the pixels 30 output, to the signal processing section 25, pixel signals generated by the pixels 30. Note that, the drive section 22 and the signal processing section 25 are circuit sections for acquiring grayscale information. Thus, in a case where only event information is acquired, the drive section 22 and the signal processing section 25 may be omitted.

The read-out region selecting section 27 selects some of the plurality of pixels 30 included in the pixel array section 21. Specifically, the read-out region selecting section 27 determines a selection region on the basis of requests from the pixels 30 in the pixel array section 21. For example, the read-out region selecting section 27 selects any one or a plurality of rows included in a two-dimensional matrix structure corresponding to the pixel array section 21. The read-out region selecting section 27 sequentially selects one or a plurality of rows on the basis of a cycle set in advance.

The signal generating section 28 generates, on the basis of output signals of pixels selected by the read-out region selecting section 27, event signals corresponding to active pixels in which events have been detected of the selected pixels. The events include an event that the intensity of light changes. The active pixels each include a pixel in which the amount of change of light having an intensity corresponding to an output signal exceeds or falls below the threshold set in advance. For example, the signal generating section 28 compares output signals of the pixels to a reference signal, and detects, as an active pixel, a pixel that outputs a signal larger or smaller than the reference signal. The signal generating section 28 generates an event signal corresponding to the active pixel.

The signal generating section 28 can include, for example, a column selecting circuit configured to arbitrate signals that are input to the signal generating section 28. Further, the signal generating section 28 can be configured to output not only information regarding active pixels in which events have been detected, but also information regarding non-active pixels in which no event has been detected.

The signal generating section 28 outputs, through an output line 15, address information and timestamp information (for example, (X, Y, T)) regarding the active pixels in which the events have been detected. However, the data that is output from the signal generating section 28 may be not only the address information and the timestamp information, but also information in a frame format (for example, (0, 0, 1, 0, . . . )).

[Configuration Example of Chip Structure]

Figure 10:
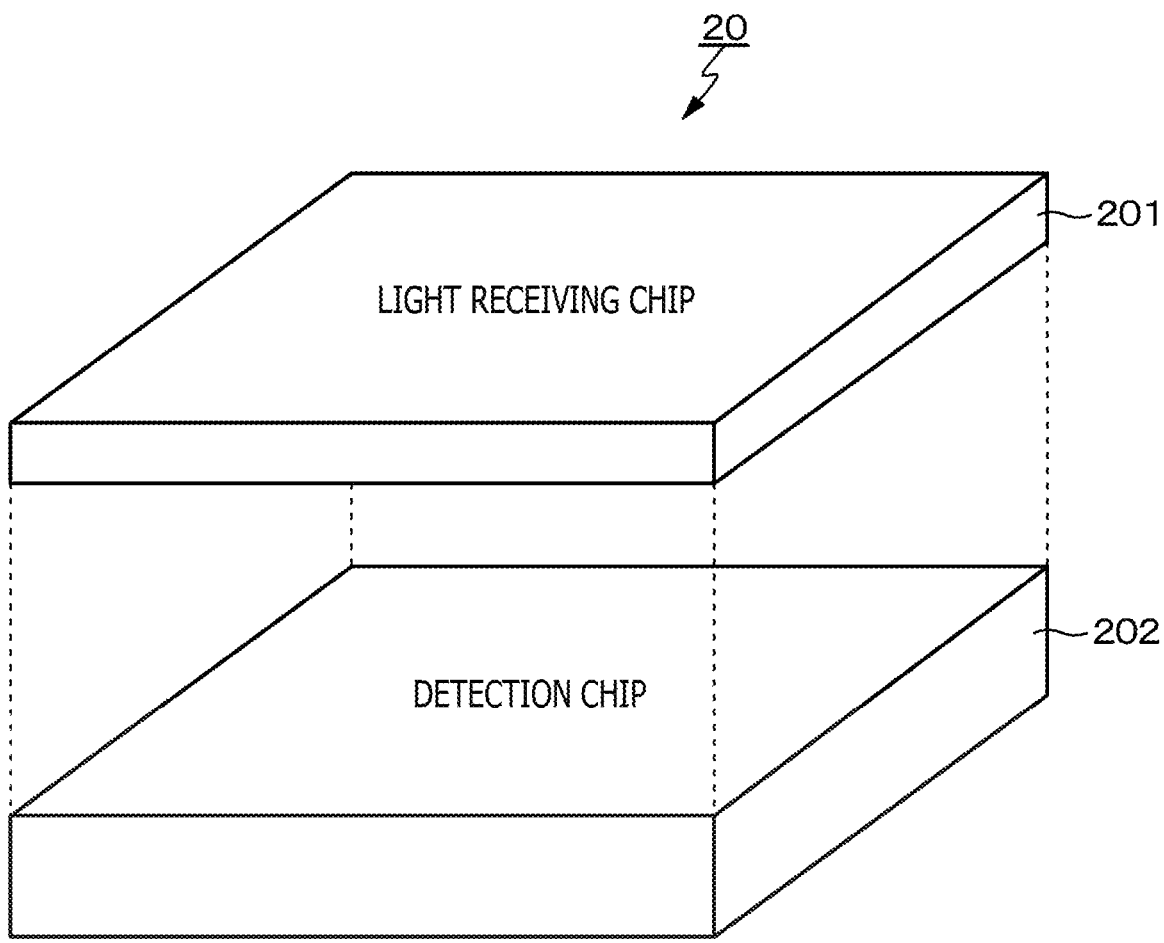
FIG. 10 is an exploded perspective view illustrating the outline of the stacked chip structure of the imaging device.

As the chip (semiconductor integrated circuit) structure of the imaging device 20 according to the first configuration example or second configuration example described above, for example, a stacked chip structure can be employed. FIG. 10 is an exploded perspective view illustrating the outline of the stacked chip structure of the imaging device 20.

As illustrated in FIG. 10, in the stacked chip structure, which is what is called a stacked structure, at least two chips, namely, a light receiving chip 201 that is a first chip and a detection chip 202 that is a second chip, are stacked. Further, in the circuit configuration of the pixel 30 illustrated in FIG. 4, the light receiving element 311 is arranged on the light receiving chip 201, while all the elements other than the light receiving element 311 or the elements of other circuit portions of the pixel 30 are arranged on the detection chip 202. The light receiving chip 201 is electrically connected to the detection chip 202 through a connection portion such as a VIA, Cu—Cu connection, or a bump.

Note that, here, the configuration example in which the light receiving element 311 is arranged on the light receiving chip 201, while the elements other than the light receiving element 311 or the elements of other circuit portions of the pixel 30 are arranged on the detection chip 202 is exemplified, but the chip structure is not limited to this configuration example.

For example, in the circuit configuration of the pixel 30 illustrated in FIG. 4, the elements of the light receiving section 31 can be arranged on the light receiving chip 201, while the elements other than the light receiving section 31 or the elements of other circuit portions of the pixel 30 can be arranged on the detection chip 202. Further, the elements of the light receiving section 31 and the reset transistor 321 and the floating diffusion layer 324 of the pixel signal generating section 32 can be arranged on the light receiving chip 201, while the remaining elements can be arranged on the detection chip 202. In addition, some elements of the address event detecting section 33 can be arranged on the light receiving chip 201 together with the elements of the light receiving section 31 and the like.

[Configuration Example of Column Processing Section]

Figure 11:
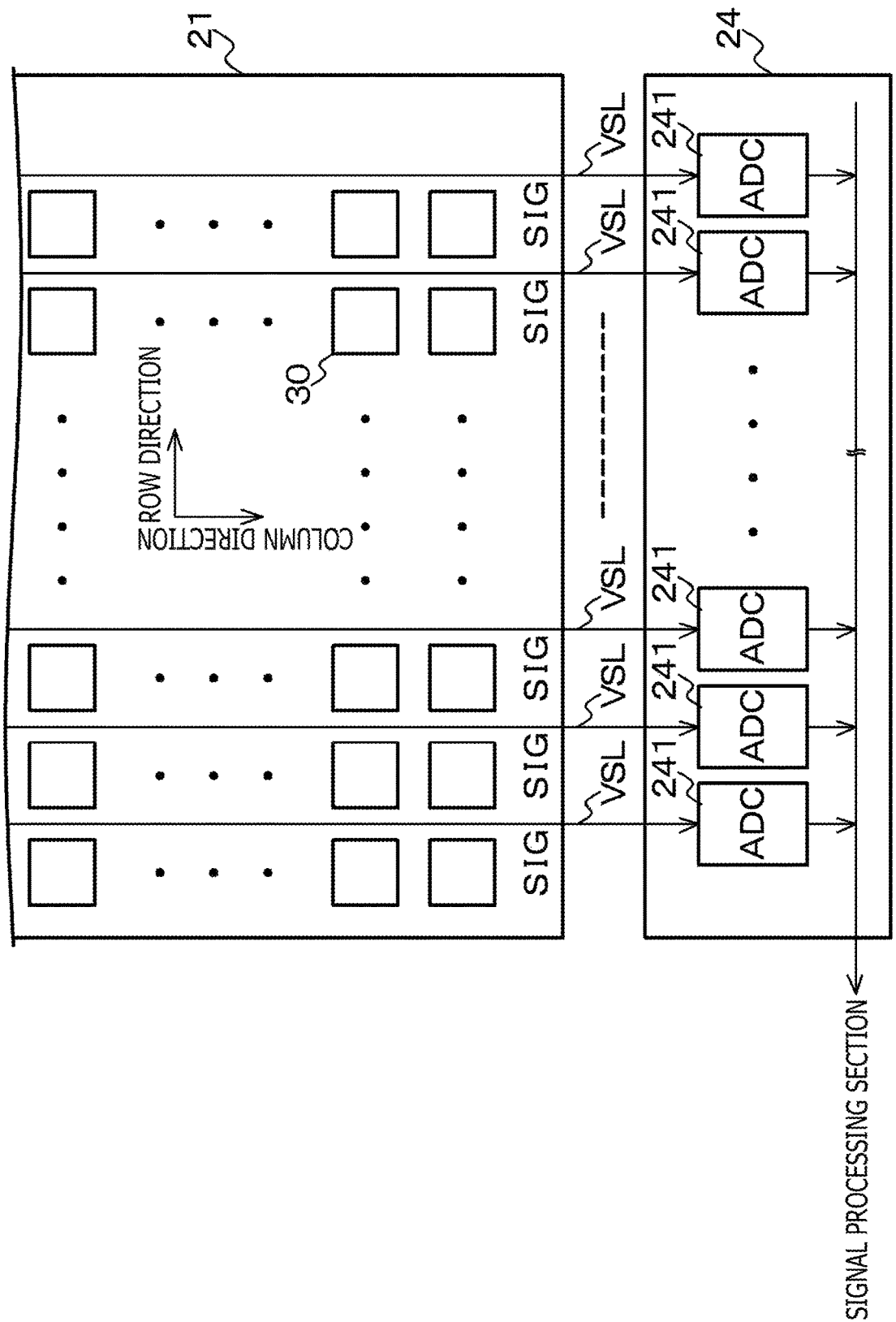
FIG. 11 is a block diagram illustrating an example of the configuration of a column processing section of the imaging device according to the first configuration example.

FIG. 11 is a block diagram illustrating an example of the configuration of the column processing section 24 of the imaging device 20 according to the first configuration example. As illustrated in FIG. 11, the column processing section 24 according to this example includes a plurality of analog-to-digital converters (ADCs) 241 arranged for the respective pixel columns of the pixel array section 21.

Note that, here, the configuration example in which the analog-to-digital converters 241 are arranged for the pixel columns of the pixel array section 21 on a one-to-one basis is exemplified, but the column processing section 24 is not limited to this configuration example. For example, the analog-to-digital converters 241 can be arranged in units of a plurality of pixel columns so that the analog-to-digital converter 241 can be used between the plurality of pixel columns in a time-division manner.

The analog-to-digital converter 241 converts the analog pixel signal SIG supplied through the vertical signal line VSL into a digital signal having more bits than the above-mentioned address event detection signal has. For example, when the address event detection signal has 2 bits, the pixel signal is converted into a digital signal having 3 bits or more (for example, 16 bits). The analog-to-digital converter 241 supplies the digital signal generated by the analog-to-digital conversion to the signal processing section 25.

[Noise Event]

Incidentally, the imaging device 20 according to the first configuration example is the asynchronous imaging device called "DVS" and includes, in each pixel 30 at the corresponding pixel address, the detection section (that is, the address event detecting section 33) configured to detect a fact that the light intensity of the pixel exceeds the predetermined threshold as an address event in real time.

This asynchronous imaging device according to the first configuration example originally acquires, when some kind of event (that is, a true event) occurs in a scene, data due to the occurrence of the true event. However, even in a scene in which no true event occurs, the asynchronous imaging device needlessly acquires data due to a noise event (false event) such as sensor noise in some cases. With this, not only a noise signal is read out, but also the signal output throughput is lowered.

<Imaging Device of Present Disclosure>

A noise event such as sensor noise occurs in each pixel individually. In contrast to this, since a moving object is large to some extent, true events concentratedly occur in pixels in a certain region. In view of this, in an embodiment of the present disclosure, in an imaging device including a plurality of pixels, each of which outputs an address event detection signal when detecting that the amount of change of an electrical signal exceeds a predetermined threshold, when pixels of a pixel combination of two or more pixels including a pixel of interest both output address event detection signals, the address event detection signals are read out. Further, when the pixels of the pixel combination of the two or more pixels output no output address event detection signal in a certain period, the pixel of interest is reset to a state in which the pixel outputs no address event detection signal.

Figure 12:
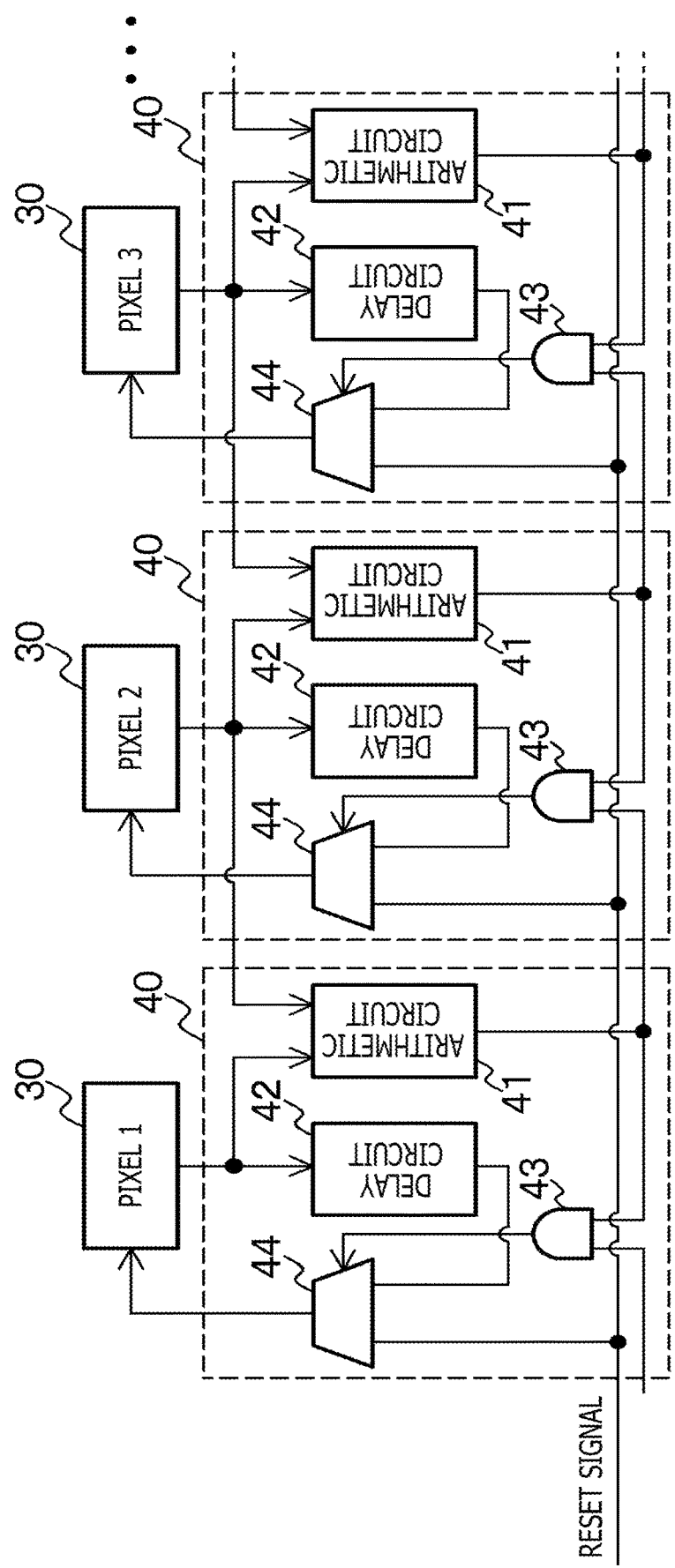
FIG. 12 is a block diagram illustrating an example of the configuration of the main part of an imaging device according to an embodiment of the present disclosure.

In the imaging device according to the embodiment of the present disclosure, the pixels of the pixel combination of the two or more pixels including the pixel of interest are a first pixel and a second pixel adjacent to each other in at least one direction in the matrix arrangement of the pixels 30 in the pixel array section 21 illustrated in FIG. 2. An example of the configuration of the main part of the imaging device according to the embodiment of the present disclosure is illustrated in FIG. 12. FIG. 12 illustrates the three pixels 30 adjacent to each other in a certain pixel row in the matrix arrangement of the pixels 30. Here, the three pixels 30 are referred to as "pixel 1," "pixel 2," and "pixel 3." The pixel 1, the pixel 2, and the pixel 3 each include a control section 40 configured to read out, when a pixel of interest that is the corresponding pixel (for example, the pixel 1), and an adjacent pixel (for example, the pixel 2) both output address event detection signals, the address event detection signals. Here, the pixel of interest (for example, the pixel 1) is the first pixel, and the adjacent pixel (for example, the pixel 2) is the second pixel.

As illustrated in FIG. 12, the control section 40 includes an arithmetic circuit 41, a delay circuit 42, an AND circuit 43, and a multiplexer 44. The arithmetic circuit 41 is connected to adjacent two pixels, for example, a pixel of interest (for example, the pixel 1) that is the first pixel and an adjacent pixel (for example, the pixel 2) that is the second pixel, and reads out, when the first pixel and the second pixel both output address event detection signals, the detection signals.

The delay circuit 42 has a delay time of a certain period. The delay circuit 42 receives an address event detection signal output from a corresponding pixel (pixel 1, 2, . . . ) as input, and delays the detection signal by the certain period (waiting period) to generate a reset signal for the corresponding pixel. The AND circuit 43 receives address event detection signals output from the arithmetic circuits 41 of adjacent two pixels as two input signals, and supplies an output signal to the multiplexer 44 as a switching control signal for the multiplexer 44.

The multiplexer 44 receives a reset signal output from the delay circuit 42 as one input, and a reset signal supplied from the arbiter section 23 (see FIG. 2) as the other input. Then, the multiplexer 44 switches the two input signals on the basis of a switching control signal output from the AND circuit 43.

Specifically, when the level of output of the arithmetic circuit 41 is low, that is, only a pixel of interest (for example, the pixel 1) of adjacent two pixels has output an address event detection signal, the multiplexer 44 selects a reset signal output from the delay circuit 42 to reset the corresponding pixel, that is, the pixel 1. With this, the pixel of interest (for example, the pixel 1) is self-reset through the delay circuit 42.

Figure 13:
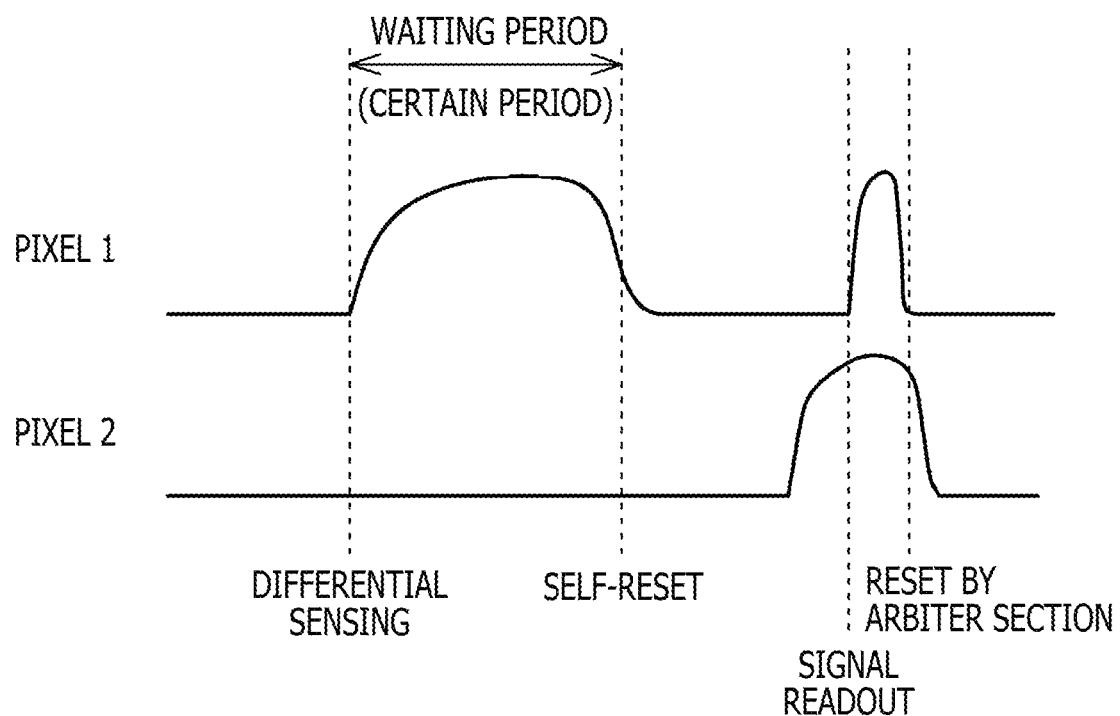
FIG. 13 is a waveform chart of output signals of "pixel 1" and "pixel 2" in a case where events occur in both adjacent two pixels and reset operation is performed with a reset signal supplied from an arbiter section.

Further, when the level of output of the arithmetic circuit 41 is high, that is, adjacent two pixels both output address event detection signals, the multiplexer 44 selects a reset signal supplied from the arbiter section 23, and sets the reset signal as a reset signal for the corresponding pixel. FIG. 13 is a waveform chart of output signals of the pixel 1 and pixel 2 in the case where events occur in both adjacent two pixels, and reset operation is performed with a reset signal supplied from the arbiter section 23 as described above.

With the action of the control section 40 having the above-mentioned configuration, when pixels of a pixel combination of two or more pixels including a pixel of interest both output address event detection signals, the detection signals are read out. Further, in a case where a pixel of interest outputs a detection signal, but a pixel associated with the pixel of interest outputs no address event detection signal within a certain period, the pixel of interest is reset, that is, self-reset.

As the arithmetic circuit 41, a configuration including an AND circuit 411, a configuration including a combination of a NAND circuit 412 and an inverter circuit 413, and a configuration including a combination of two inverter circuits 414 and 415 and a NOR circuit 416, which are illustrated in FIG. 14A, can be exemplified. As the delay circuit 42, a configuration in which inverter circuits $417_1$ to $417_n$ in a plurality of stages n are connected in series, which is illustrated in FIG. 14B, can be exemplified. To the delay circuit 42, a certain period is set with the number of stages n of the inverter circuits $417_1$ to $417_n$.

As described above, in the asynchronous imaging device, which is called "DVS," when pixels of a pixel combination of two or more pixels including a pixel of interest both output address event detection signals, the address event detection signals are read out so that the effects of a noise event such as sensor noise that occurs in each pixel individually can be softened. With this, data can be acquired only when true events occur, with the result that noise signals are not read out and the signal output throughput is not lowered. Further, the occurrence of true events can be positively and quickly sensed.

Now, specific embodiments of the present embodiment in which two or more pixels of a pixel combination including a pixel of interest configured to output address event detection signals within a certain period are described. In each embodiment described below, to simplify the figures, the illustrations of the delay circuit 42, the AND circuit 43, and the multiplexer 44 of the control section 40 are omitted, and only the arithmetic circuit 41 is illustrated.

Embodiment 1

Embodiment 1 is an example in which the arithmetic circuit 41 is shared by two pixels adjacent to each other in one direction in the matrix arrangement of the plurality of pixels, for example, the row direction. FIG. 15 is a block diagram of the configuration of the main part of the pixel array section 21 according to Embodiment 1.

In Embodiment 1, in the matrix arrangement of the pixels 30, the arithmetic circuits 41 are arranged in units of the two pixels 30 and 30 adjacent to each other in the row direction. The arithmetic circuit 41 is connected to the two pixels 30 and 30, which serve as the first pixel and the second pixel, and reads out, when the two pixels 30 and 30 both output address event detection signals, the address event detection signals.

According to Embodiment 1, when the first pixel is a pixel of interest, and two pixels including the pixel of interest, that is, the first pixel and the second pixel both output address event detection signals, the address event detection signals are read out. With this, the effects of a noise event such as sensor noise that occurs in each pixel individually can be softened so that data can be acquired only when true events occur.

Note that, in Embodiment 1, the configuration in which the arithmetic circuit is shared by the two pixels adjacent to each other in the row direction in the matrix arrangement is exemplified, but a configuration in which the arithmetic circuit 41 is shared by two pixels adjacent to each other in the column direction can also be employed.

Embodiment 2

Figure 16:
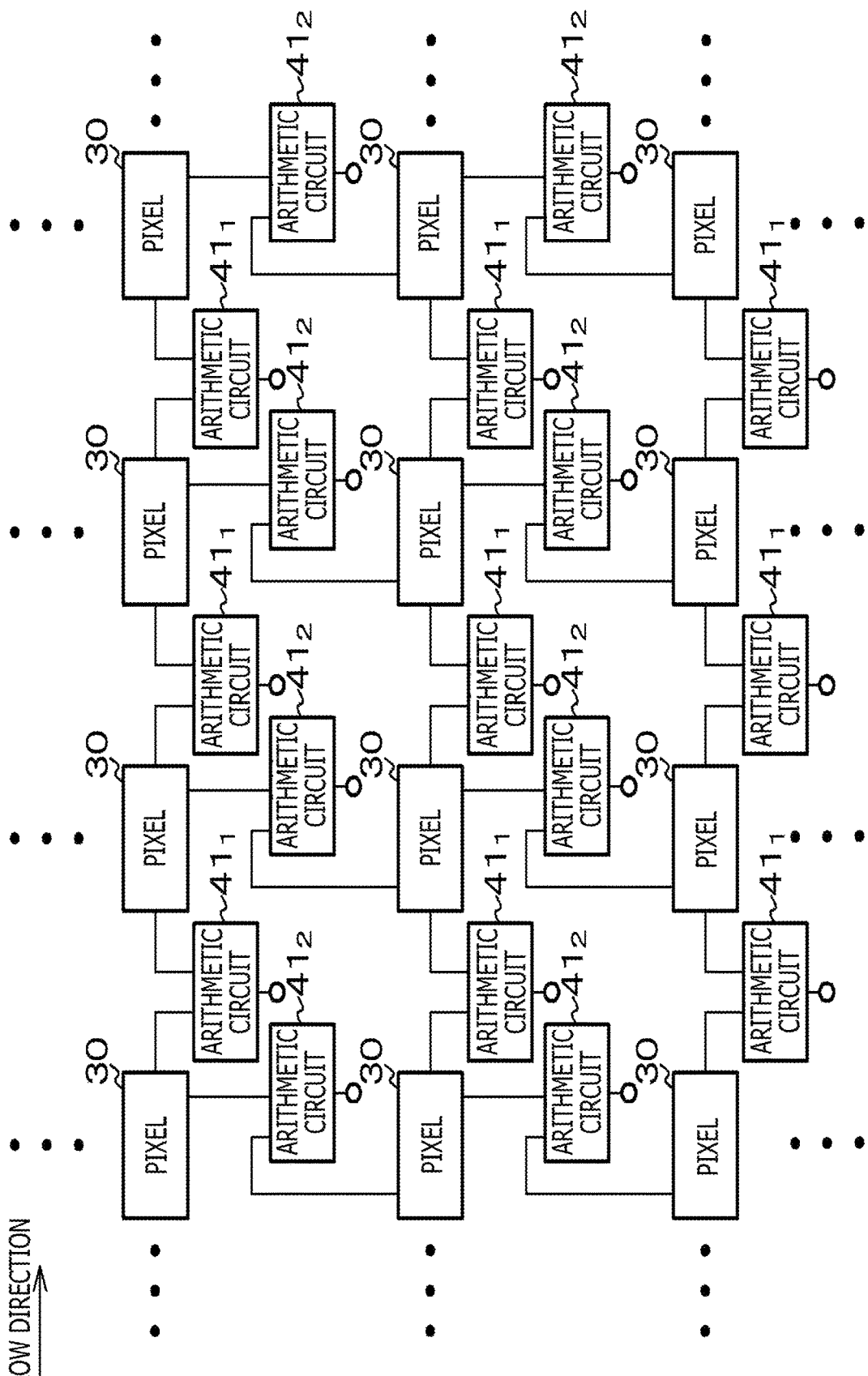
FIG. 16 is a block diagram illustrating the configuration of the main part of a pixel array section according to Embodiment 2.

Embodiment 2 is an example in which the arithmetic circuit 41 is shared by two pixels adjacent to each other in one of two directions in the matrix arrangement of the plurality of pixels, that is, the row direction and the column direction. FIG. 16 is a block diagram of the configuration of the main part of the pixel array section 21 according to Embodiment 2.

In Embodiment 2, in the matrix arrangement of the pixels 30, arithmetic circuits $41_1$ are arranged in units of the two pixels 30 and 30 adjacent to each other in the row direction, and arithmetic circuits $41_2$ are arranged in units of the two pixels 30 and 30 adjacent to each other in the column direction. The arithmetic circuits $41_1$ and $42_2$ each read out, when the two pixels 30 and 30, which are a pair, both output address event detection signals, the address event detection signals.

According to Embodiment 2, the number of pixels near a pixel of interest that are used in determining whether events have been sensed or not is larger than that in the case of Embodiment 1, and hence the effects of noise events can be more softened, and in particular, the sensitivity for events due to moving objects that are large to some extent can be increased.

Embodiment 3

Figure 17:
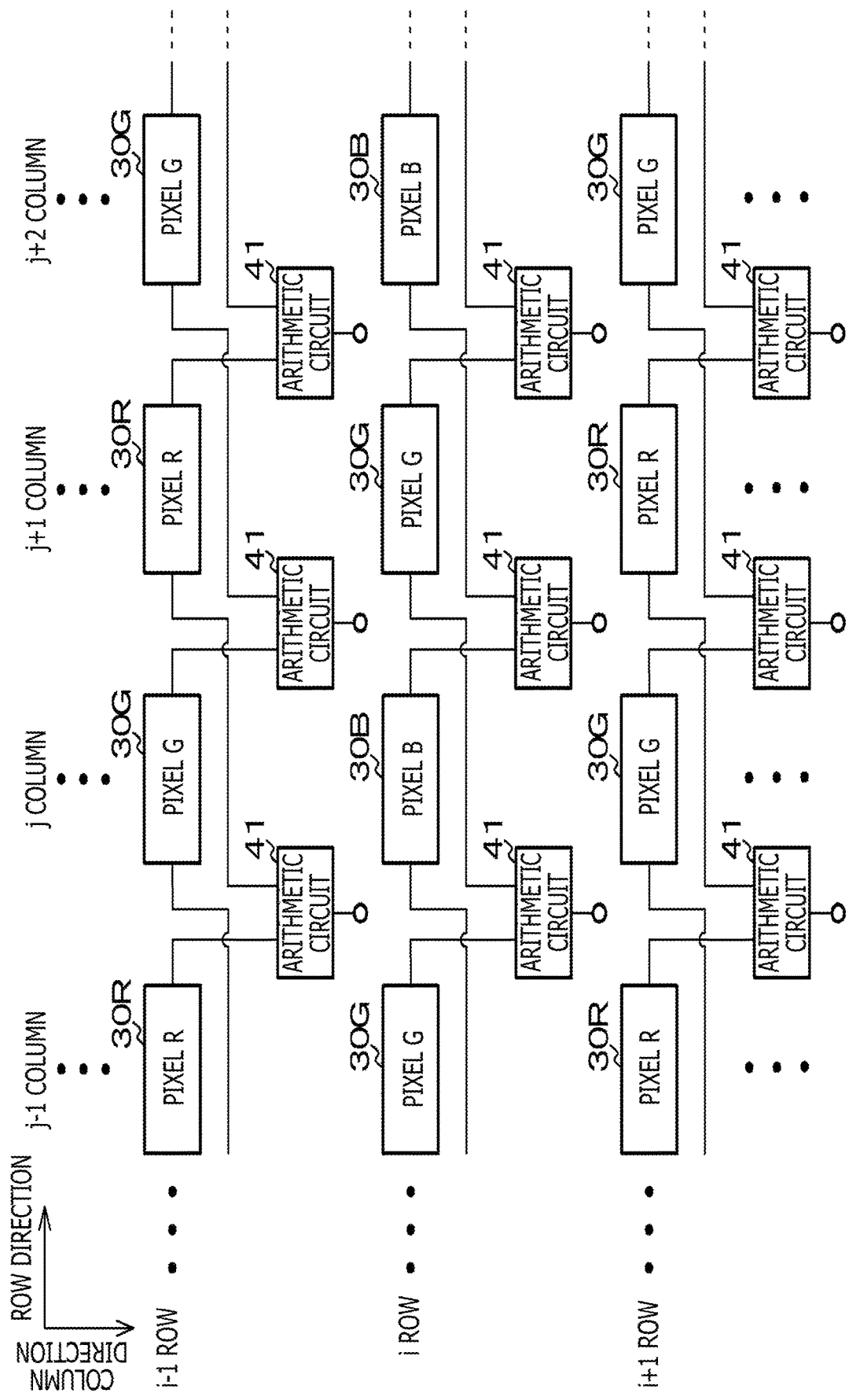
FIG. 17 is a block diagram illustrating the configuration of the main part of a pixel array section according to Embodiment 3.

Embodiment 3 is a modified example of Embodiment 1. This is an example in which the arithmetic circuit 41 is shared by two pixels adjacent to each other in one direction in the matrix arrangement in a case where there is a color filter. Here, a case where a color filter having an RGB (red/green/blue) Bayer array is arranged on the pixels of the pixel array section 21 is exemplified. FIG. 17 is a block diagram of the configuration of the main part of the pixel array section 21 according to Embodiment 3.

In Embodiment 3, with regard to the first pixel and the second pixel that share the arithmetic circuit 41, when the first pixel is a pixel of interest, the second pixel is a same color pixel adjacent to the pixel of interest with one pixel interposed therebetween in one direction in the matrix arrangement, for example, the row direction. That is, the pixel of interest and the same color pixel adjacent thereto in the row direction with one pixel interposed therebetween share the arithmetic circuit 41.

Specifically, in the i−1 row, a pixel 30R in the j−1 column and the same color pixel 30R in the j+1 column that is adjacent thereto with one pixel interposed therebetween share the arithmetic circuit 41, and a pixel 30G in the j column and the same color pixel 30G in the j+2 column that is adjacent thereto with one pixel interposed therebetween share the arithmetic circuit 41. In the i row, the pixel 30G in the j−1 column and the same color pixel 30G in the j+1 column that is adjacent thereto with one pixel interposed therebetween share the arithmetic circuit 41, and a pixel 30B in the j column and the same color pixel 30B in the j+2 column that is adjacent thereto with one pixel interposed therebetween share the arithmetic circuit 41.

The actions and effects of Embodiment 3 are similar to those of Embodiment 1. Further, as in the case of Embodiment 1, a configuration in which a pixel of interest and a same color pixel adjacent thereto in the column direction with one pixel interposed therebetween share the arithmetic circuit 41 can be employed. Specifically, in the j−1 column, the pixel 30R in the i−1 row and the same color pixel 30R in the i+1 row that is adjacent thereto with one pixel interposed therebetween share the arithmetic circuit 41, and in the j column, the pixel 30G in the i−1 row and the same color pixel 30G in the i+1 row that is adjacent thereto with one pixel interposed therebetween share the arithmetic circuit 41.

Embodiment 4

Figure 18:
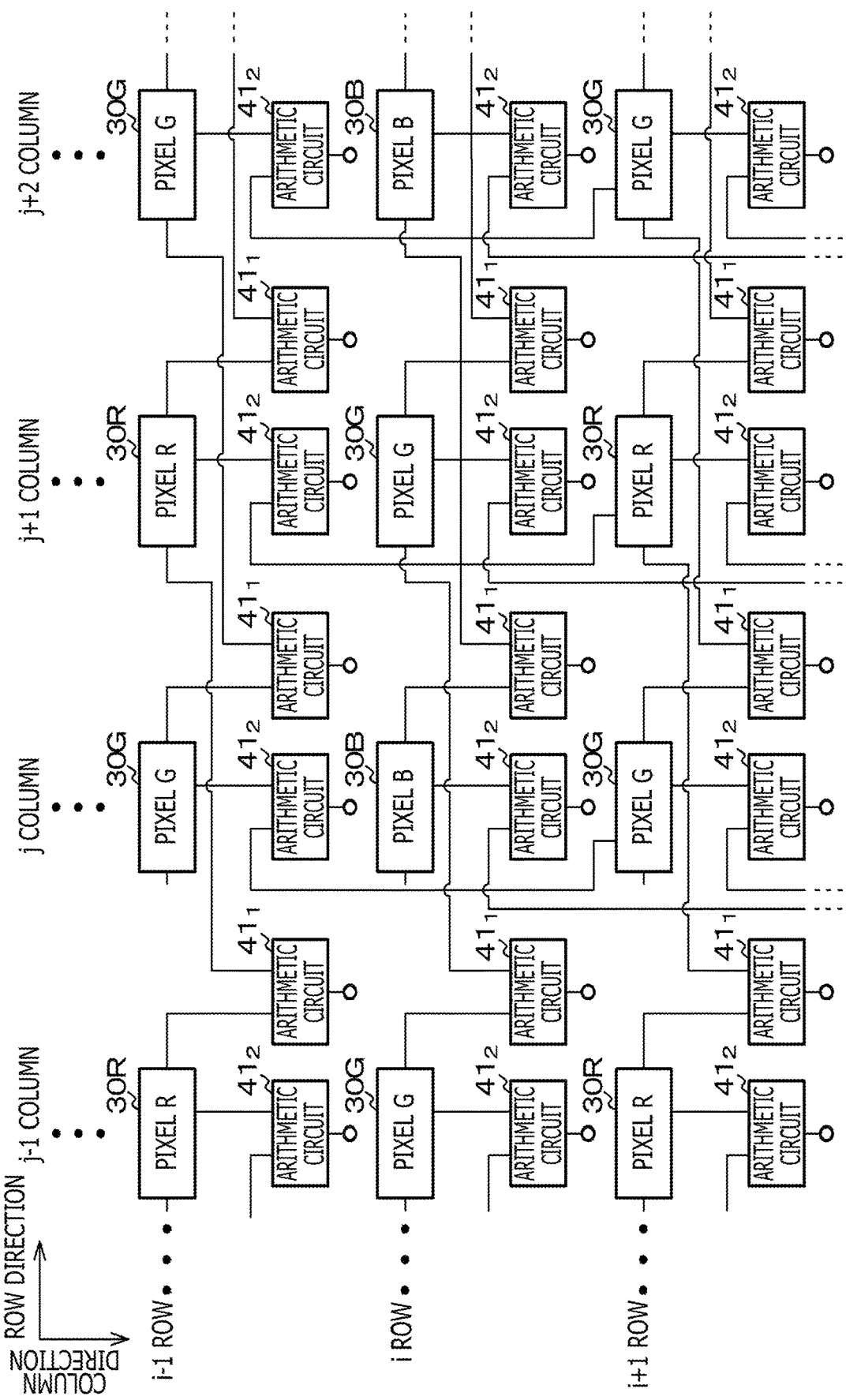
FIG. 18 is a block diagram illustrating the configuration of the main part of a pixel array section according to Embodiment 4.

Embodiment 4 is a modified example of Embodiment 2. This is an example in which two pixels adjacent to each other in one of the two directions in the matrix arrangement share the arithmetic circuit in a case where, for example, there is a color filter of an RGB Bayer array. FIG. 18 is a block diagram of the configuration of the main part of the pixel array section 21 according to Embodiment 4.

In Embodiment 4, in the matrix arrangement of the pixels 30, the two same color pixels 30 and 30 adjacent to each other in the row direction with one pixel interposed therebetween share the arithmetic circuit 41, and the two same color pixels 30 and 30 adjacent to each other in the column direction with one pixel interposed therebetween share the arithmetic circuit 41.

Specifically, in the i row, the pixel 30G in the j−1 column and the same color pixel 30G in the j+1 column that is adjacent thereto with one pixel interposed therebetween share an arithmetic circuit $41_1$, and the pixel 30B in the j column and the same color pixel 30B in the j+2 column that is adjacent thereto with one pixel interposed therebetween share the arithmetic circuit. In the j column, the pixel 30G in the i−1 row and the same color pixel 30G in the i+1 row that is adjacent thereto with one pixel interposed therebetween share an arithmetic circuit $41_2$, and in the j+1 column, the pixel 30R in the i−1 row and the same color pixel 30R in the i+1 row that is adjacent thereto with one pixel interposed therebetween share the arithmetic circuit $41_2$. The actions and effects of Embodiment 4 are similar to those of Embodiment 2.

MODIFIED EXAMPLE

The technology according to the present disclosure is described above on the basis of the preferred embodiments, but the technology according to the present disclosure is not limited to the embodiments. The configuration and structure of the imaging device described in the above-mentioned embodiments are exemplary and can be modified appropriately. For example, in the above-mentioned embodiments, in the pixel 30, the pixel signal generating section 32 and the light receiving section 31 are provided on a one-to-one basis. However, a configuration in which the light receiving sections 31 are organized into blocks in units of the plurality of light receiving sections 31, and the pixel signal generating section 32 is provided for each pixel block so that the pixel signal generating section 32 is shared by the plurality of light receiving sections 31 in the pixel block can be employed.

<Application Examples of Technology according to Present Disclosure>

The technology according to the present disclosure is applicable to various products. More specific application examples are described below. For example, the technology according to the present disclosure may be realized as a ranging device that is mounted on any kind of moving bodies, for example, vehicles, electric vehicles, hybrid electric vehicles, motorcycles, bicycles, personal mobilities, airplanes, drones, ships, robots, construction machinery, and agricultural machinery (tractors).

[Moving Body]

Figure 19:
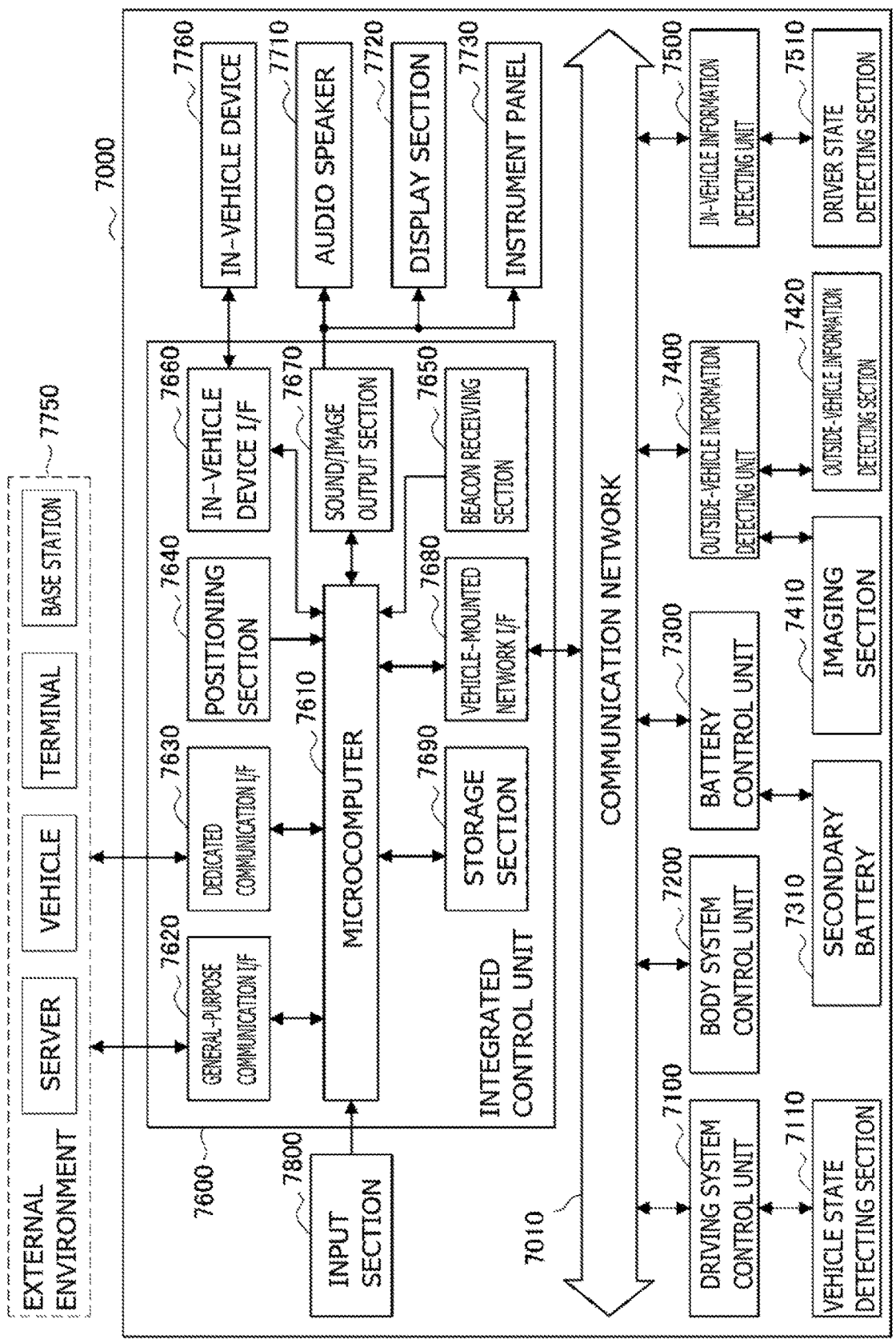
FIG. 19 is a block diagram depicting an example of schematic configuration of a vehicle control system as an example of a mobile body control system to which the technology according to the present disclosure can be applied.

FIG. 19 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 19, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 19 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 20:
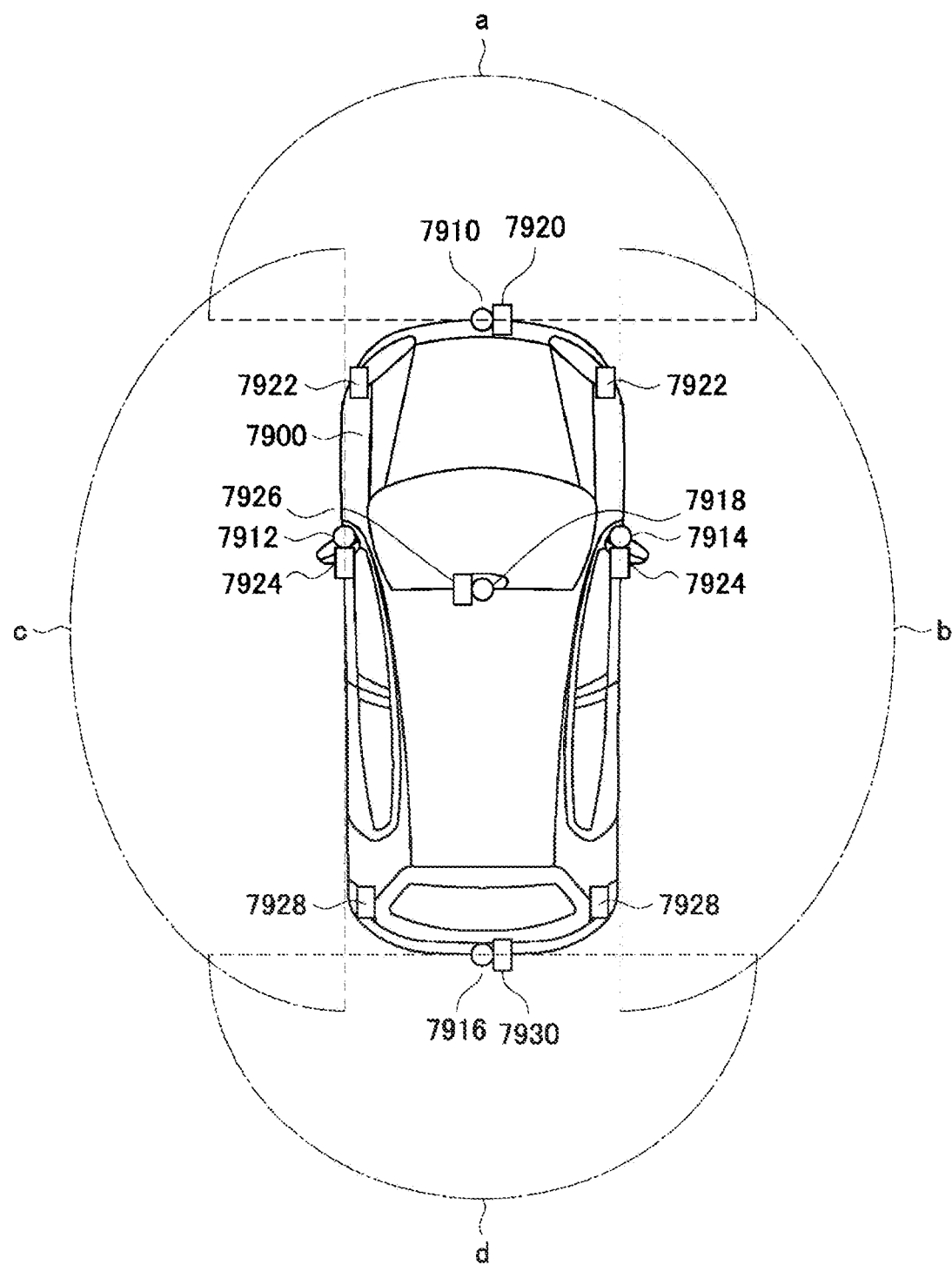
FIG. 20 depicts an example of installation positions of an imaging section.

FIG. 20 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 20 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 19, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 19, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 19 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

An example of the vehicle control system to which the technology according to the present disclosure is applicable is described above. The technology according to the present disclosure is applicable to, of the configurations described above, for example, the imaging sections 7910, 7912, 7914, 7916, and 7918, the outside-vehicle information detecting sections 7920, 7922, 7924, 7926, 7928, and 7930, the driver state detecting section 7510, or the like. Specifically, the imaging system 10 of FIG. 1 including the imaging device of the present disclosure is applicable to these imaging sections and detection sections. Then, with the application of the technology according to the present disclosure, the effects of noise events such as sensor noise can be softened, and the occurrence of true events can thus be sensed positively and quickly, with the result that safe vehicle traveling can be realized.

<Configurations that Present Disclosure can Take>

Note that, the present disclosure can also take the following configurations.

<<A. Imaging Device>>

[A-1]

An imaging device, including:
   a plurality of pixels each including a light receiving element configured to perform photoelectric conversion on incident light to generate an electrical signal, the pixels each being configured to output a detection signal when detecting that an amount of change of the electrical signal exceeds a predetermined threshold; and
   a control section configured to read out, when pixels of a pixel combination of two or more pixels including a pixel of interest both output detection signals, the detection signals.

[A-2]

The imaging device according to [A-1], in which the control section resets the pixel of interest when the pixel of interest outputs the detection signal in a case where a pixel associated with the pixel of interest outputs no detection signal within a certain period.

[A-3]

The imaging device according to [A-1] or [A-2], in which the pixel combination includes a combination of the pixel of interest and a pixel adjacent to the pixel of interest in one direction in a matrix arrangement of the plurality of pixels.

[A-4]

The imaging device according to [A-1] or [A-2], in which the pixel combination includes a combination of the pixel of interest and a pixel adjacent to the pixel of interest in two directions in a matrix arrangement of the plurality of pixels.

[A-5]

The imaging device according to [A-1] or [A-2], in which the pixel combination includes a combination of the pixel of interest and a pixel adjacent to the pixel of interest with one pixel interposed between the pixels in one direction in a matrix arrangement of the plurality of pixels.

[A-6]

The imaging device according to [A-1] or [A-2], in which the pixel combination includes a combination of the pixel of interest and a pixel adjacent to the pixel of interest with one pixel interposed between the pixels in two directions in a matrix arrangement of the plurality of pixels.

[A-7]

The imaging device according to any one of [A-1] to [A-6], in which the control section includes an arithmetic circuit configured to perform a logical operation of the detection signals output from the pixels of the pixel combination of the two or more pixels.

[A-8]

The imaging device according to [A-7], in which the arithmetic circuit includes an AND circuit.

[A-9]

The imaging device according to [A-7], in which the arithmetic circuit includes a combination of a NAND circuit and an inverter circuit.

[A-10]

The imaging device according to [A-7], in which the arithmetic circuit includes a combination of two inverter circuits and a NOR circuit.

[A-11]

An imaging device, including:
a plurality of pixels each including a light receiving element configured to perform photoelectric conversion on incident light to generate an electrical signal, the pixels each being configured to output a detection signal when detecting that an amount of change of the electrical signal exceeds a predetermined threshold; and
a control section connected to a first pixel and a second pixel adjacent to each other in at least one direction in a matrix arrangement of the plurality of pixels, and configured to read out, when the first pixel and the second pixel both output detection signals, the detection signals.

[A-12]

The imaging device according to [A-11], in which
a color filter is arranged on the plurality of pixels, and
the first pixel and the second pixel are same color pixels.

<<B. Electronic Equipment>>

[B-1]

Electronic equipment, including:
an imaging device; and
an imaging optical system configured to capture incident light to lead the incident light to the imaging device, in which
the imaging device includes
a plurality of pixels each including a light receiving element configured to perform photoelectric conversion on the incident light captured by the imaging optical system to generate an electrical signal, the pixels each being configured to output a detection signal when detecting that an amount of change of the electrical signal exceeds a predetermined threshold, and
a control section configured to read out, when pixels of a pixel combination of two or more pixels including a pixel of interest configured to output a detection signal both output detection signals, the detection signals.

[B-2]

The electronic equipment according to [B-1], in which the control section resets the pixel of interest when the pixel of interest outputs the detection signal in a case where a pixel associated with the pixel of interest outputs no detection signal within a certain period.

[B-3]

The electronic equipment according to [B-1] or [B-2], in which the pixel combination includes a combination of the pixel of interest and a pixel adjacent to the pixel of interest in one direction in a matrix arrangement of the plurality of pixels.

[B-4]

The electronic equipment according to [B-1] or [B-2], in which the pixel combination includes a combination of the pixel of interest and a pixel adjacent to the pixel of interest in two directions in a matrix arrangement of the plurality of pixels.

[B-5]

The electronic equipment according to [B-1] or [B-2], in which the pixel combination includes a combination of the pixel of interest and a pixel adjacent to the pixel of interest with one pixel interposed between the pixels in one direction in a matrix arrangement of the plurality of pixels.

[B-6]

The electronic equipment according to [B-1] or [B-2], in which the pixel combination includes a combination of the pixel of interest and a pixel adjacent to the pixel of interest with one pixel interposed between the pixels in two directions in a matrix arrangement of the plurality of pixels.

[B-7]

The electronic equipment according to any one of [B-1] to [B-6], in which the control section includes an arithmetic circuit configured to perform a logical operation of the detection signals output from the pixels of the pixel combination of the two or more pixels.

[B-8]

The electronic equipment according to [B-7], in which the arithmetic circuit includes an AND circuit.

[B-9]

The electronic equipment according to [B-7], in which the arithmetic circuit includes a combination of a NAND circuit and an inverter circuit.

[B-10]

The electronic equipment according to [B-7], in which the arithmetic circuit includes a combination of two inverter circuits and a NOR circuit.

REFERENCE SIGNS LIST

10 . . . Imaging system, 11 . . . Imaging lens, 12 . . . Storage section, 13 . . . Control section, 20 . . . Imaging device, 21 . . . Pixel array section, 22 . . . Drive section, 23 . . . Arbiter section, 24 . . . Column processing section, 25 . . . Signal processing section, 27 . . . Read-out region selecting section, 28 . . . Signal generating section, Pixel . . . 30, 31 . . . Light receiving section, 32 . . . Pixel signal generating section, 33 . . . Address event detecting section, 40 . . . Control section, 41 ($41_1$, $41_2$) . . . Arithmetic circuit, 42 . . . Delay circuit, 43 . . . AND circuit, 44 . . . Multiplexer, 311 . . . Light receiving element, 312 . . . Transfer transistor, 313 . . . OFG transistor, 321 . . . Reset transistor, 322 . . . Amplification transistor, 323 . . . Selection transistor, 324 . . . Floating diffusion layer

The invention claimed is:

1. An imaging device, comprising:
a plurality of pixels, wherein
each pixel of the plurality of pixels includes a light receiving element configured to execute photoelectric conversion on incident light to generate an electrical signal, and
each pixel of the plurality of pixels is configured to output a detection signal based on an amount of change of the electrical signal that exceeds a threshold; and
a control section configured to:
read out, in a case where each pixel of a pixel combination of at least two pixels of the plurality of pixels outputs the detection signal, the detection signal of each pixel of the pixel combination, wherein
the pixel combination includes a pixel of interest, and
the plurality of pixels includes a pixel associated with the pixel of interest; and
reset the pixel of interest in a case where the pixel of interest outputs the detection signal, and the pixel associated with the pixel of interest does not output the detection signal within a specific period.

2. The imaging device according to claim 1, wherein the pixel combination includes a combination of:
the pixel of interest, and
a pixel, of the plurality of pixels, adjacent to the pixel of interest in one direction in a matrix arrangement of the plurality of pixels.

3. The imaging device according to claim 1, wherein the pixel combination includes a combination of:
the pixel of interest, and
a pixel, of the plurality of pixels, adjacent to the pixel of interest in two directions in a matrix arrangement of the plurality of pixels.

4. The imaging device according to claim 1, wherein the pixel combination includes a combination of:
the pixel of interest, and
a specific pixel, of the plurality of pixels, adjacent to the pixel of interest with one pixel between the pixel of interest and the specific pixel in one direction in a matrix arrangement of the plurality of pixels.

5. The imaging device according to claim 1, wherein the pixel combination includes a combination of:
the pixel of interest, and
a specific pixel, of the plurality of pixels, adjacent to the pixel of interest with one pixel between the pixel of interest and the specific pixel in two directions in a matrix arrangement of the plurality of pixels.

6. The imaging device according to claim 1, wherein the control section includes an arithmetic circuit configured to execute a logical operation of the detection signal output from each pixel of the pixel combination of the at least two pixels.

7. The imaging device according to claim 6, wherein the arithmetic circuit includes an AND circuit.

8. The imaging device according to claim 6, wherein the arithmetic circuit includes a combination of a NAND circuit and an inverter circuit.

9. The imaging device according to claim 6, wherein the arithmetic circuit includes a combination of two inverter circuits and a NOR circuit.

10. An imaging device, comprising:
a plurality of pixels, wherein
each pixel of the plurality of pixels includes a light receiving element configured to execute photoelectric conversion on incident light to generate an electrical signal,
each pixel of the plurality of pixels is configured to output a detection signal based on an amount of change of the electrical signal that exceeds a predetermined threshold;
the plurality of pixels includes a first pixel and a second pixel, and
the second pixel is adjacent to the first pixel in at least one direction in a matrix arrangement of the plurality of pixels; and
a control section connected to the first pixel and the second pixel wherein the control section is configured to:
read out, in a case where each of the first pixel and the second pixel output the detection signal, the detection signal of each of the first pixel and the second pixel; and
reset the first pixel in a case where the first pixel outputs the detection signal, and the second pixel associated with the pixel of interest does not output the detection signal within a specific period.

11. The imaging device according to claim 10, further comprising a color filter on the plurality of pixels, wherein the first pixel and the second pixel are same color pixels.

12. An electronic equipment, comprising:
an imaging device; and
an imaging optical system configured to capture incident light to lead the incident light to the imaging device, wherein the imaging device includes:
a plurality of pixels, wherein
each pixel of the plurality of pixels includes a light receiving element configured to execute photoelectric conversion on the captured incident light to generate an electrical signal, and
each pixel of the plurality of pixels is configured to output a detection signal based on an amount of change of the electrical signal that exceeds a threshold; and
a control section configured to:
read out, in a case where each pixel of a pixel combination of at least two pixels of the plurality of pixels outputs the detection signal, the detection signal of each pixel of the pixel combination, wherein
the pixel combination includes a pixel of interest, and
the plurality of pixels includes a pixel associated with the pixel of interest; and
reset the pixel of interest in a case where the pixel of interest outputs the detection signal, and the pixel associated with the pixel of interest does not output the detection signal within a specific period.

* * * * *